United States Patent [19]

Noguchi et al.

[11] Patent Number: 4,978,980
[45] Date of Patent: Dec. 18, 1990

[54] CONTROL METHOD FOR A BOTH-SURFACE/MULTIPLEX RECORDING APPARATUS

[75] Inventors: Akio Noguchi, Ebina; Hiroshi Hashimoto, Tokyo, both of Japan

[73] Assignee: Canon Kabushiki Kaisha, Tokyo, Japan

[21] Appl. No.: 478,735

[22] Filed: Feb. 9, 1990

Related U.S. Application Data

[63] Continuation of Ser. No. 372,120, Jun. 28, 1989, abandoned, which is a continuation of Ser. No. 289,464, Dec. 22, 1988, abandoned, which is a continuation of Ser. No. 204,616, Jun. 9, 1988, abandoned.

[30] Foreign Application Priority Data

Jun. 16, 1987 [JP] Japan ................... 62-149389
Jul. 6, 1987 [JP] Japan ................... 62-166942

[51] Int. Cl.⁵ .......................................... G01D 15/00
[52] U.S. Cl. ................................. 346/150; 400/188
[58] Field of Search ................. 346/150, 154, 136; 358/296, 300–302, 75, 78; 364/518, 519; 400/188, 189; 271/65, 186

[56] References Cited

U.S. PATENT DOCUMENTS

| | | | |
|---|---|---|---|
| 4,007,489 | 2/1987 | Helmbuger et al. | 346/157 |
| 4,099,150 | 7/1978 | Connin | 346/160 |
| 4,140,387 | 2/1979 | Gustafson | 346/160 |
| 4,499,500 | 2/1985 | Nagashima | 358/300 |
| 4,630,128 | 12/1986 | Gokita | 346/160 |
| 4,688,928 | 8/1987 | Iwai | 346/160 |
| 4,712,118 | 12/1987 | Seto et al. | 346/108 |
| 4,745,490 | 5/1988 | Shimizu et al. | 358/300 |

FOREIGN PATENT DOCUMENTS 0221328 5/1987 European Pat. Off. ........... 346/160

Primary Examiner—Donald A. Griffin
Attorney, Agent, or Firm—Fitzpatrick, Cella, Harper & Scinto

[57] ABSTRACT

In a control method for a both-surface recording apparatus provided with a memory for memorizing and reading record information sequent on each page, recording apparatus for recording the record information of a plurality of pages, out of the record information, discretely on a first surface and a second surface of a recording medium, and control apparatus for controlling the memory and the recording apparatus, recording is continuedly effected on a first surface of a new recording medium until the first recording medium on a first surface of which recording has been effected again arrives at the entrance to the recording apparatus, and thereafter, recording is effected on a second surface of the first recording medium, whereafter recording of a first surface of another new recording medium and recording on a second surface of the recording medium on the first surface of which recording has been effected are alternately effected.

14 Claims, 24 Drawing Sheets

(FOR FIG. 6A, FIG. 8A)

(FOR FIG. 6B FIG. 8B)

FIG. 30
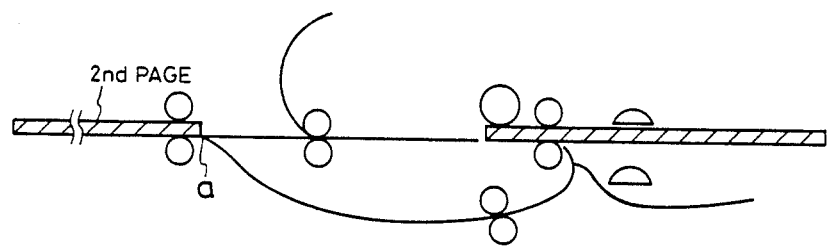
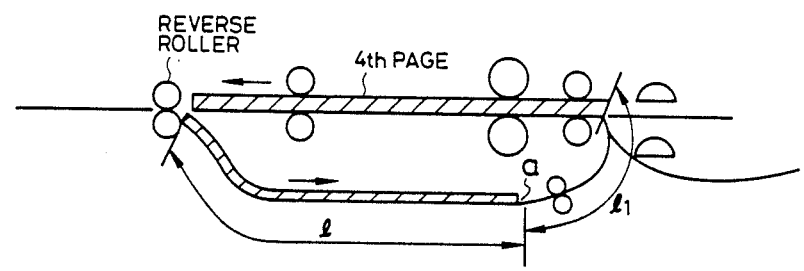
FIG. 31
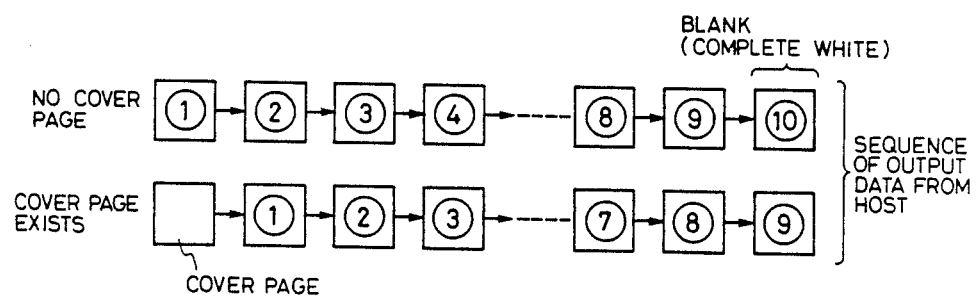

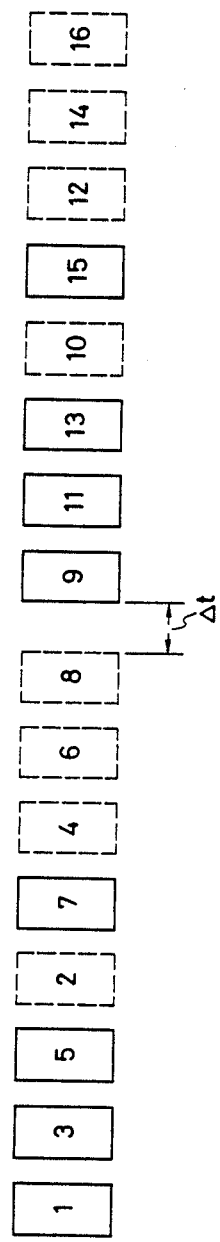
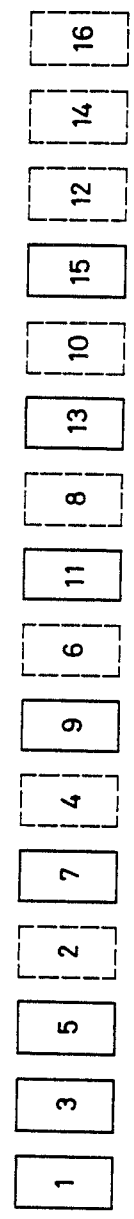
FIG. 34
FIG. 35

CONTROL METHOD FOR A BOTH-SURFACE/MULTIPLEX RECORDING APPARATUS

This application is a continuation of application Ser. No. 07/372,120 filed June 28, 1989, which application is a continuation of Ser. No. 07/289,464 filed Dec. 22, 1988, which application is a continuation of Ser. No. 07/204,616 filed June 9, 1988, all now abandoned.

BACKGROUND OF THE INVENTION

1. Field of the Invention and Related Art

This invention relates to a control method for a both-surface recording apparatus, and more particularly to a method of controlling the order or sequence of pages recorded by a both-surface recording apparatus which effects recording, for example, on the front and back surfaces of a recording medium. This invention further relates to a printer apparatus capable of both surface or multiplex printing, and in particular to a control system for a printer (recording apparatus) in which a plurality of cut-sheet-like paper leaves (recording mediums) are caused to make the circuit of round and through the machine, thereby accomplishing both-surface or multiplex printing.

An example of the prior art will first be described with reference to the accompanying drawings.

FIG. 1 is a longitudinal cross-sectional view schematically showing the construction of an image forming apparatus. In FIG. 1, the reference numeral 1 designates a sheet supply cassette containing a number of sheet materials 2 therein, the reference numeral 3 denotes a sheet supply roller as feeding means for feeding the sheet materials 2 in the sheet supply cassette 1, the reference numeral 4 designates register rollers for effecting the positioning and timing of a sheet material 2 fed by the sheet supply roller 3, the reference numeral 5 denotes image forming means for transferring a toner image onto the sheet material 2 by an electrostatic system, the reference numeral 6 designates fixing rollers for fixing the toner image on the sheet material 2 passed through the image forming means 5, the reference numeral 7 denotes a sheet discharge tray as discharge means for containing the sheet material 2 discharged, the reference numeral 8 designates a first conveyance path, the reference numeral 9 denotes a second conveyance path, the reference numeral 10 designates a third conveyance path, and the reference numeral 11 denotes a branch-off conveyance mechanism installed at the branch-off position of the first conveyance path 8, the second conveyance path 9 and the third conveyance path 10. The first conveyance path 8 extends from the sheet supply roller 3 to the front of the fixing rollers 6 via the image forming means 5. The second conveyance path 9 connects the downstream side end of the first conveyance path 8 and that side of the first conveyance path 8 which is upstream of the image forming means 5 (between the register rollers 4 and the sheet supply roller 3). The third conveyance path 10 connects the downstream side end of the first conveyance path 8 and the tray 7 which is the discharge means.

The branch-off conveyance mechanism 11 has deflecting means (flapper) 12 capable of changing between two positions by leftward rotation or rightward rotation, first forward and reverse conveying means (forwardly and reversely rotatable rollers) 13-15 disposed on the second conveyance path 9 side and the third conveyance path 10 side, the second forward and reverse conveying means (forwardly and reversely rotatable rollers) 16. Thus, the deflecting means 12, when in its rightwardly rotated position as indicated in solid lines, connects the first conveyance path 8 and the third conveyance path 10 and directs the sheet material 2 conveyed along the first conveyance path 8 toward the third conveyance path 10. The deflecting means 12, when in its leftwardly rotated position as indicated by broken lines, connects the first conveyance path 8 and the second conveyance path 9 and directs the sheet material 2 conveyed along the first conveyance path 8 toward the second conveyance path 9. The first forward and reverse conveying means 13-15 are adapted to convey the sheet material 2 directed from the first conveyance path 8 to the second conveyance path 2 side intactly toward the second conveyance path 9 during the forward rotation thereof, and to change the direction of movement of the sheet material 2 and direct the sheet material 2 toward the third conveyance path 10 during the reverse rotation thereof. The second forward and reverse conveying means (rollers) 16 are adapted to convey the sheet material 2 directed from the first conveyance path 8 to the third conveyance path 10 intactly toward the third conveyance path 10 during the forward rotation thereof (at this time, they serve also as sheet discharge rollers), and to change the direction of movement of the sheet material 2 and direct the sheet material 2 toward the second conveyance path 9 during the reverse rotation thereof.

In FIG. 1, the reference numerals 17 and 18 designate forwardly rotatable conveying rollers installed at the upstream end and the downstream end, respectively, of the first conveyance path 8. The reference numeral 50 designates a back surface record sheet supply opening, and the reference numeral 60 denotes a front surface record sheet supply opening.

Referring to FIG. 2, the rollers 16 are being rightwardly rotated, and when the trailing end of the sheet material has passed through the deflecting means 12, the rollers 16 are leftwardly rotated to reconvey the sheet material as shown in FIG. 3.

In the above-described example of the prior art, however, the time required from after the trailing end of the recording medium after the recording on the first surface thereof has passed through the image forming means 5 until the recording medium is directed to the third conveyance path 10 and is reversed by the second forward and reverse conveying means 16 and is directed to the second conveyance path 9 for recording to be effected on the second surface thereof by the image forming means 5 is much longer than the time required for at least the recording medium 2 to pass through the image forming means 5. Therefore, the interval between the first surface recording and the second surface recording during both-surface recording becomes great, and this has led to the inconvenience that the throughput is much reduced.

Another example of the prior art will hereinafter be described in detail by mode with reference to FIG. 4.

(a) Both-Surface Image Formation and Face-up Sheet Discharge Mode

A sheet material having an image formed on the first surface thereof by image forming means 108 is conveyed along a first conveyance path 101 in order of fixing rollers 109 and conveying rollers 119, and then is directed to a second conveyance path 102 by deflecting means 110 and 111. The sheet material then passes between conveying rollers 118 and over deflecting means 117, whereafter it is reversed by intermediate sheet discharge rollers 115 and is once contained in an intermediate tray 113. The sheet material is then returned to the second conveyance path 102 by sheet resupply or reload rollers 116 and is conveyed between conveying rollers 120, 121, 122 and register rollers 123 in the named order, and an image is formed on a second surface of the sheet material by the image forming means 108. Thereafter, the sheet material is conveyed along the first conveyance path 101 in order of the fixing rollers 109, the conveying rollers 119 and the deflecting means 110, and is discharged outwardly of the apparatus by sheet discharge rollers 107.

(b) Both-Surface Image Formation and Face-down Sheet Discharge Mode

The sheet material having an image formed on a first surface thereof by the image forming means 108 is conveyed along the first conveyance path 101 in order of the fixing rollers 109 and the conveying rollers 119, and then is directed to the second conveyance path 102 by the deflecting means 110 and 111. The sheet material then passes between the conveying rollers 118 and over the deflecting means 117, whereafter it is reversed by the intermediate sheet discharge rollers 115 and is once contained in the tray 113, and is then returned to the second conveyance path 102 by the sheet resupply rollers 116. Then the sheet material is conveyed along the first conveyance path 101 in order of the fixing rollers 109 and the conveying rollers 119, and then is directed to the second conveyance path 102 by the deflecting means 110 and 111, and then is reversed by reverse rotation of the conveying rollers 118 and is conveyed to the first conveyance path 101 through the third conveyance path 103, and is discharged outwardly of the apparatus by the sheet discharge rollers 107.

However, when the conveyance by the first conveyance path 101, the second conveyance path 102 and the third conveyance path 103 is adopted, a number of branch-off conveying portions and an intermediate stacker portion 113 become necessary, and this has led to the problem that the conveying system becomes complicated and moreover the length of the conveyance path becomes great and the apparatus becomes bulky.

As an apparatus likewise having the above-noted disadvantage, there is also a laser beam printer as shown in FIG. 5.

FIG. 5 is a cross-sectional view illustrating an example of the both-surface print type laser beam printer. The reference numeral 201 designates an outside host comprised of a computer or the like. This outputs image print information to a printer control device 202. The reference numeral 203 denotes an image information memory device which once introduces thereinto the image print information delivered from the outside host 201 on the basis of a synchronizing signal output from the printer control device 202. The reference numeral 204 designates a printer body (print engine), which effects image formation in accordance with the conventional electrostatic photographic process on the basis of raster data corresponding to one line read out from the image information recording apparatus 203 by the printer control device 202.

The printer body 204 is comprised of a sheet supplying part, a printing part, a sheet conveying part and a sheet discharging part. The sheet supplying part is comprised of a paper cassette (sheet supplying cassette) 205, a sheet feeding roller 206, cut sheets (recording sheets) 207 contained in the paper cassette 205, etc., and has the function of supplying the cut sheets 207 into the printer body 204 by rotation of the paper feeding roller 206.

The printing part is comprised of a laser scanner 208, a laser light emitting unit (laser unit) 209, a turn-back mirror 210, a primary charger 212, a cleaner 213, a photosensitive drum 214, a developing device 215 and a transfer-separation charger 216. The laser unit 209 emits a laser beam 211 modulated by the image print information from the printer control device 202, and this laser beam 211 is deflected by the laser scanner 208 and horizontally scans the rotating photosensitive drum 214 at a predetermined speed by the turn-back mirror 210. An electrostatic latent image formed on the photosensitive drum 214 by this scanning is visualized by the developing device 215 and a toner image is transferred onto the supplied recording sheet 207. The sheet conveying part is comprised of a first sheet conveyance path comprising various guide plates, a conveyor belt, conveying rollers, etc. and going round from register rollers 218 through the photosensitive drum 214, a fixing device 217 and a direction flapper 219 to sheet discharge rollers 222, and a second sheet conveyance path branching off from the first sheet conveyance path at the direction flapper 219 and going round from an intermediate tray 220 through both-surface sheet supply rollers (sheet resupply rollers) 221 to the register rollers 218 and circulating (coming back) to the first sheet conveyance path. The first conveyance path functions chiefly as a conveyance path used for the electrophotographic process, and the second conveyance path functions as a reversing conveyance path for reversing the recording sheets 207, and is used during both-surface or multiplex printing.

The sheet discharging part is comprised of sheet discharge rollers 222 and a sheet discharge tray 223, and stacks the recording sheets 207 after the termination of both-surface printing, one-surface printing or one-surface multiplex printing. [Sequence of Single Sheet Both-Surface Printing]

In the above-described construction, control of single or one sheet (two pages) both-surface printing by the printer control device 202 is executed as follows.

The sheet feeding roller 206 is first driven to feed a recording sheet 207 and convey it to the register rollers 218 (in the meantime, the register rollers 218 remain stopped). The image information to be printed on the first page is read out from the image information memory device 203 and is output to the laser unit 209. The laser beam 211, modulated by the image information of the first page, is output from the laser unit 209. Also, the register rollers 218 are rotated at such timing that the leading end edge of the recording sheet 207 arrives at the transfer separation charger 216 when the leading end edge of the image formed on the photosensitive drum 214 by the laser beam 211 arrives at the transfer-separation charger 216.

As the recording sheet 207 is conveyed from the register rollers 218 toward the fixing device 217, the image print information of the first page is printed on a first surface of the recording sheet 207. Further, the direction flapper 219 is driven, for example, upwardly as viewed in FIG. 5 so that the recording sheet 207 passed through the fixing device 217 is conveyed toward the above-described second sheet conveyance path, i.e., toward the intermediate tray 220. The recording sheet 207 controlled in direction by the direction flapper 219 and having terminated the printing onto the first surface thereof is reversed by the intermediate tray 220, and is conveyed to the register rollers 218 by the driving of the sheet resupply rollers 221 and is once stopped there. Then, as in the first surface printing sequence, the image information of the second page is printed on a second surface (the back surface) of the resupplied recording sheet 207. In this case, however, the printer control device 202 outputs the image print information of the second page to the laser unit 209, and the image print information of the second page is transferred to the second surface of the recording sheet 207 being conveyed, and the transferred toner image is fixed by the fixing device 217 at the subsequent stage, and the direction flapper 219 is controlled in order that the recording sheet 207 having the images formed on the first and second surfaces thereof may be discharged onto the sheet discharge tray 223, whereby one sheet both-surface printing on the recording sheet 207 (two-page printing) is terminated and thus, there is obtained a both-surface hard copy.

The above-described construction of FIG. 5 also suffers from inconveniences similar to those peculiar to the constructions of FIGS. 1 and 4.

SUMMARY OF THE INVENTION

The present invention has been made in view of the above-noted circumstances and an object of which is to provide a both-surface recording apparatus which is simple in the structure of a conveyance path system and keeps the throughput highest by being designed such that, at the start of recording, recording from a sheet supply opening for front surface recording is contained at least until the first recording medium arrives at a sheet supply opening for back surface recording, and after the recording medium has arrived at the sheet supply opening for back surface recording, recording is effected on the back surface of the recording medium fed at first and thereafter recording is effected alternately on the front surface and the back surface correspondingly to the number of recording mediums and after a predetermined number of sheets is reached, recording on the remaining back surface is controlled.

According to the present invention, by a recording apparatus having a both-surface recording mechanism, it is possible to maximize the throughput (the number of recorded sheets per unit time) during both-surface recording without setting a complicated recording sequence.

It is also an object of the present invention to provide a printer control system in which the possibility of supply of recording sheets from a sheet supply cassette occurring during the cassette/both-surface alternate sheet supply mode process is monitored to control the execution of the print sequence on the remaining recording sheets, whereby the print waiting time of the remaining recording sheets can be reduced greatly.

The printer control system according to the present invention is a system which carries out a sheet supply monitoring process for monitoring the possibility of sheet supply from outside sheet supply means during the sheet supply process from the outside sheet supply means and sheet resupply means, and a priority sheet supply process for changing the order of sheet supply determined by a predetermined print sequence on the basis of the result of the monitoring in said sheet supply monitoring process and supplying by priority the remaining recording sheets from the sheet resupply means.

In the present invention, the possibility of sheet supply from the outside sheet supply means is monitored during the sheet supply process from the outside sheet supply means and the sheet resupply means, and the order of sheet supply determined by a predetermined print sequence is changed on the basis of the result of said monitoring and the remaining recording sheets are supplied by priority from the sheet resupply means.

The present invention has the excellent advantage that where the sheet supply from the outside sheet supply means and the sheet resupply means has been designated, when the number of recording sheets for the demand for sheet supply from the outside sheet supply means exceeds the number of recording sheets to be admitted, the remaining recording sheets can be subjected to image formation by priority and discharged to thereby greatly shorten the print resumption waiting time of the recording sheet supplied from the sheet resupply means and obviate the disappearance of image information based on an error occurring during the waiting.

BRIEF DESCRIPTION OF THE DRAWINGS

FIG. 30 is a schematic view illustrating the principle of the invention.

FIG. 31 is an illustration showing the order of recording in a case where the cover page exists and a case where no cover page exists.

FIG. 34 is a schematic diagram illustrating the page print output state by the present invention (FIG. 33).

FIG. 35 is a schematic diagram illustrating the ordinary page print output state before improved.

DESCRIPTION OF THE PREFERRED EMBODIMENTS

Figure 6A:
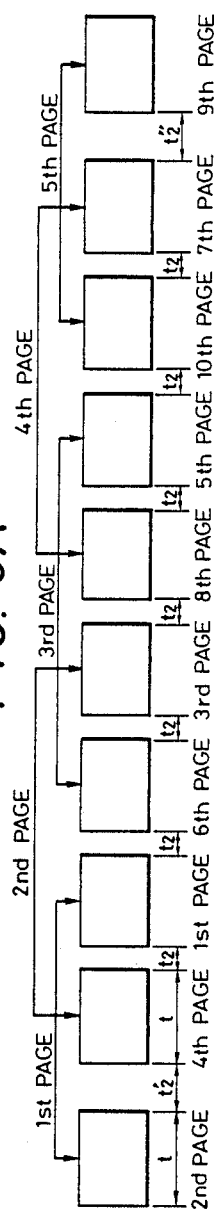
FIG. 6A illustrates the sequence of recording in the case of face-down sheet discharge (in which, after printing, a sheet is reversed and discharged).
Figure 12:
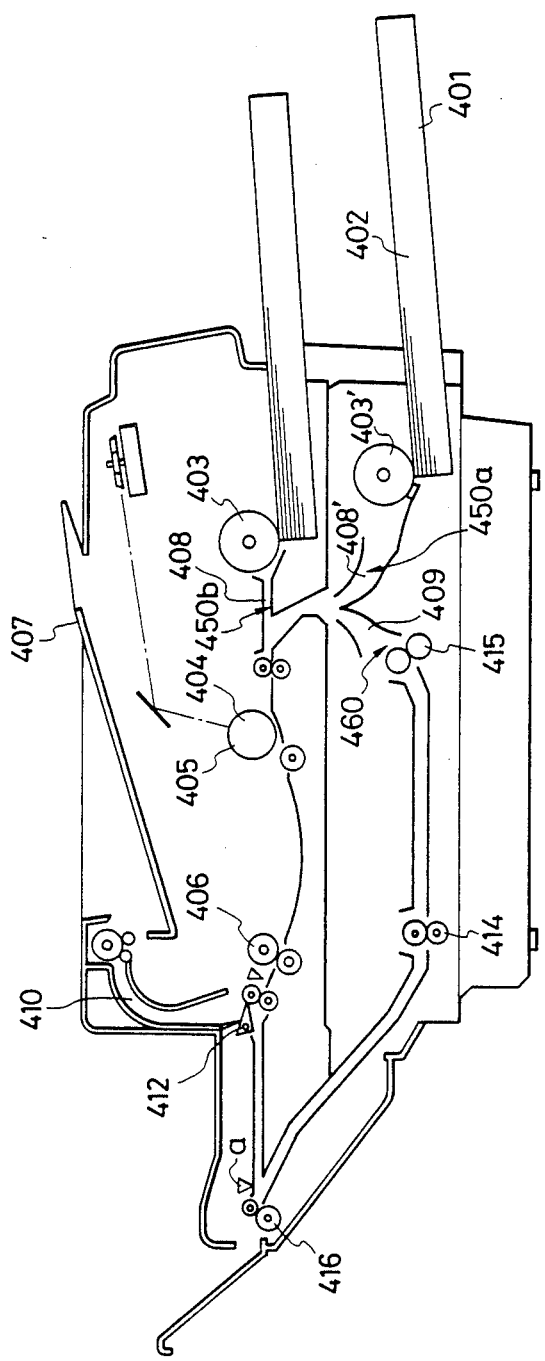
FIG. 12 is a cross-sectional view of a recording apparatus to which the present invention is applied.

FIG. 6A is a schematic diagram showing the sequence of recording by a both-surface recording apparatus according to an embodiment of the present invention, and it has been output from the both-surface recording apparatus shown in FIG. 12.

Figure 1:
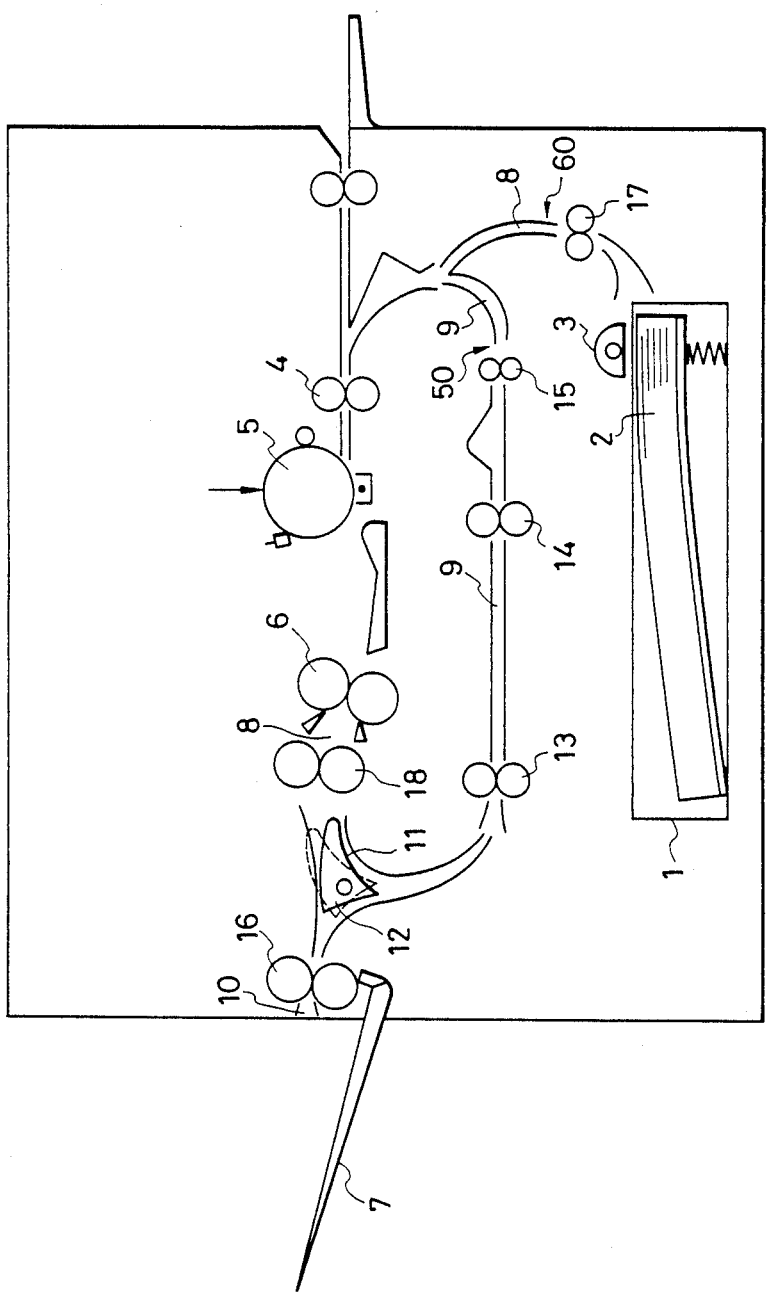
FIGS. 1 to 4 are cross-sectional views illustrating the flow of a sheet in an example of the prior art.
Figure 2:
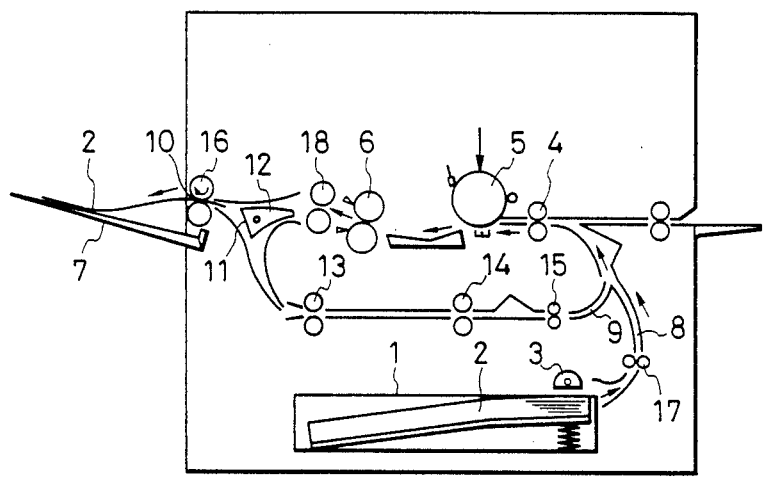
Figure 3:
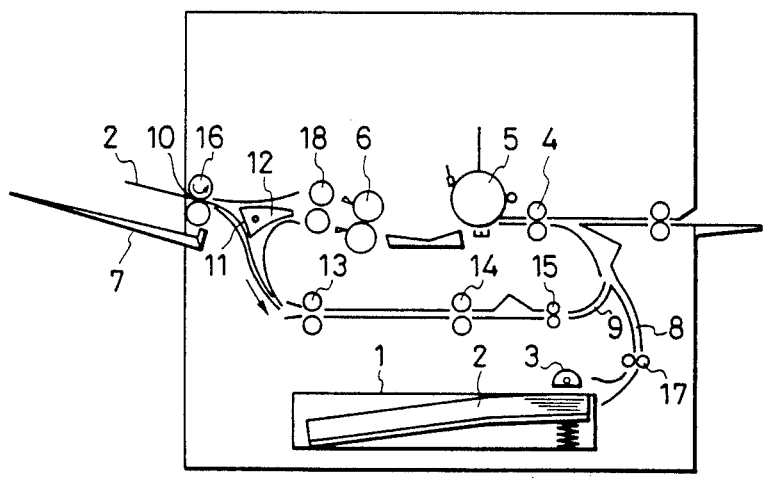
Figure 4:
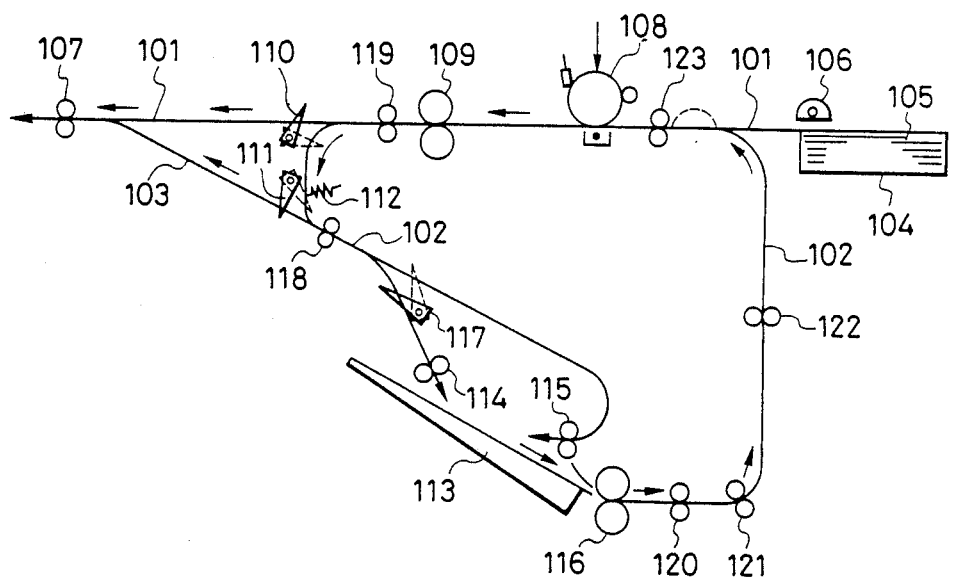
Figure 5:
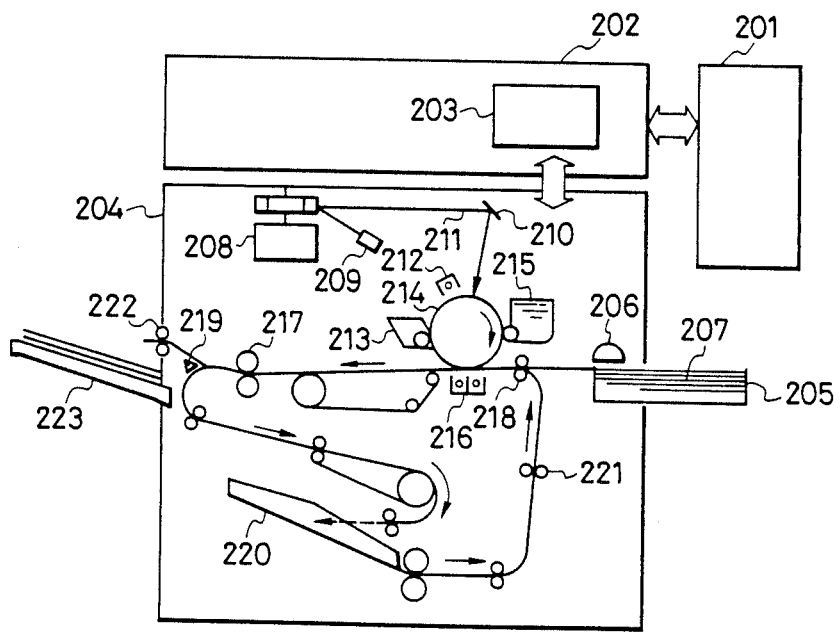
FIG. 5 is a cross-sectional view of a laser printer according to another example of the prior art.

The present both-surface recording apparatus is provided with upper and lower cassette sheet supply trays, and is designed to effect recording on the first surface by the sheet supply from one of a first conveyance path 408 from an upper sheet supply opening and a first conveyance path 408' from a lower sheet supply opening. Other members not described here are similar to the members shown in FIG. 1 and common in reference numerals of the order of 10.

Also, where so-called one-surface or single surface recording is effected, a recording material whose first surface only is to be subjected to recording is discharged onto a discharge tray 407 with its recording surface facing down (hereinafter this will be referred to as "face-down sheet discharge"). In FIG. 12, the reference characters 450a and 450b designate upper and lower first surface record sheet supply openings, and the reference numeral 460 denotes a second surface record sheet supply opening.

Figure 7:
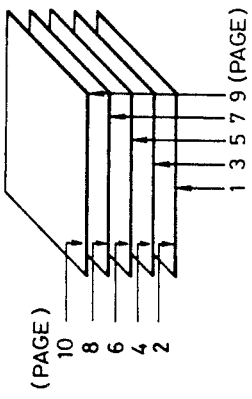
FIG. 7 is a perspective view showing the face-down sheet discharge.

FIG. 7 shows the order of pages of five recording mediums piled on a discharge tray, and this order is obtained when recording has been effected in the order of page shown in FIG. 6A by the both-surface recording apparatus shown in FIG. 12.

FIGS. 13 to 20 schematically show the movement of recording mediums when recording is effected in the order of pages shown in FIG. 6.

Figure 13:
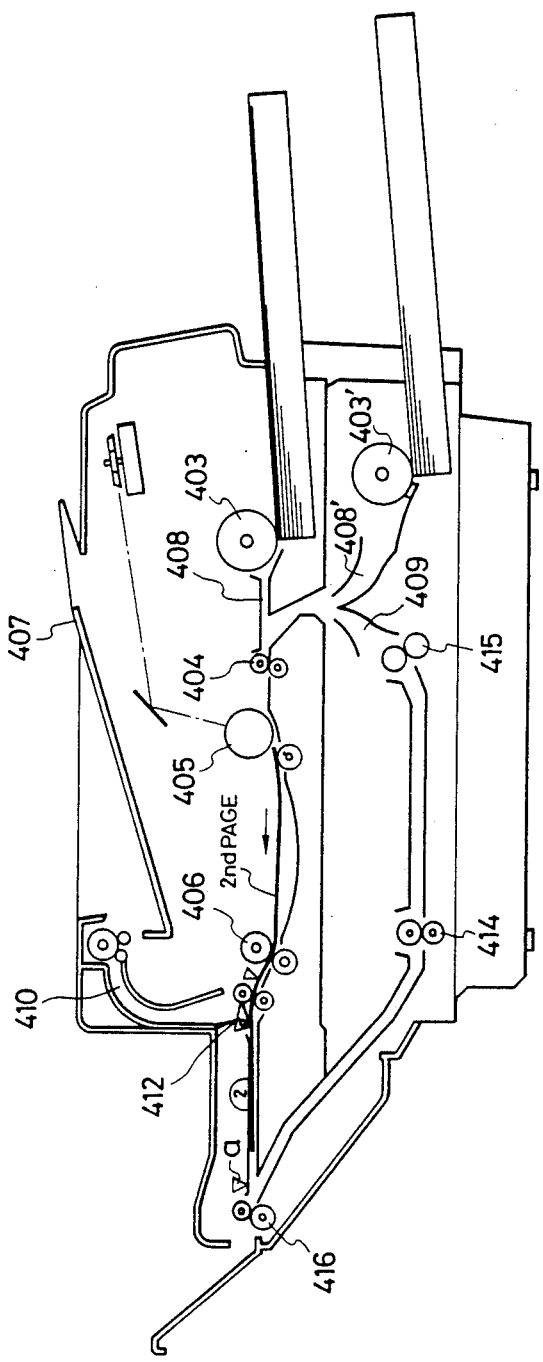
FIGS. 13 to 20 are cross-sectional views showing the flow of sheets in the apparatus of FIG. 12.

If the recording time interval for maintaining the highest throughput of ordinary recording mediums after the second page has been printed as shown in FIG. 13 is $t_2$, the fourth page begins to be recorded in a necessary time $t_2$ which is longer than the time $t_1$ ($t_2' > t_2$). This is because the present recording apparatus is operated at a uniform speed and when the trailing end edge of a recording medium after having recorded the second page is detected by a sensor a, a time t plus $t_2$ ($t + t_2$) or more is required until the recording medium is reversed by second forward and reverse conveying means, and is conveyed to first forward and reverse conveying means, and if this is neglected, that recording medium will collide against the second (fourth page) recording medium.

Figure 15:
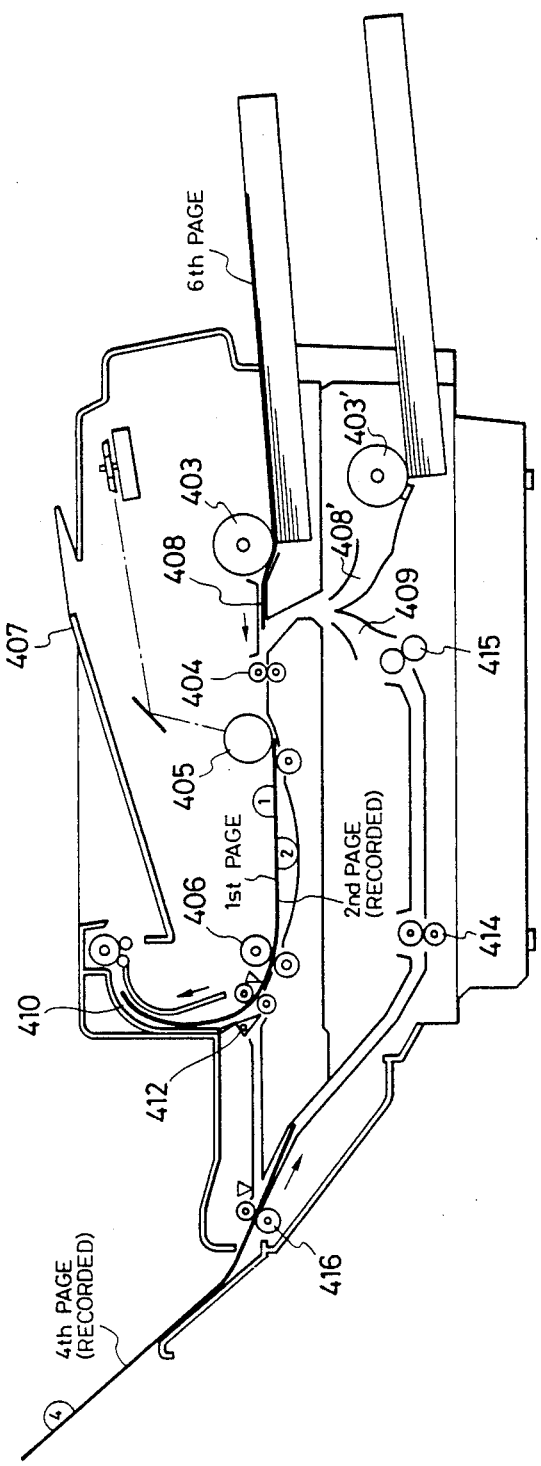
Figure 16:
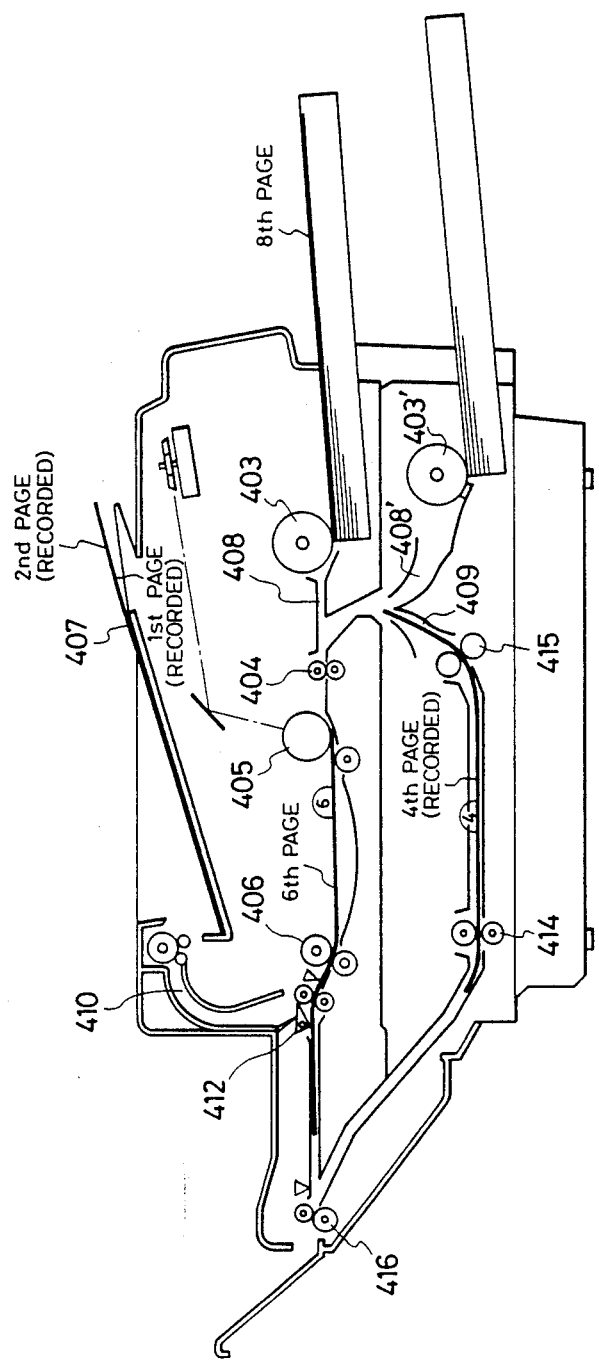
Figure 17:
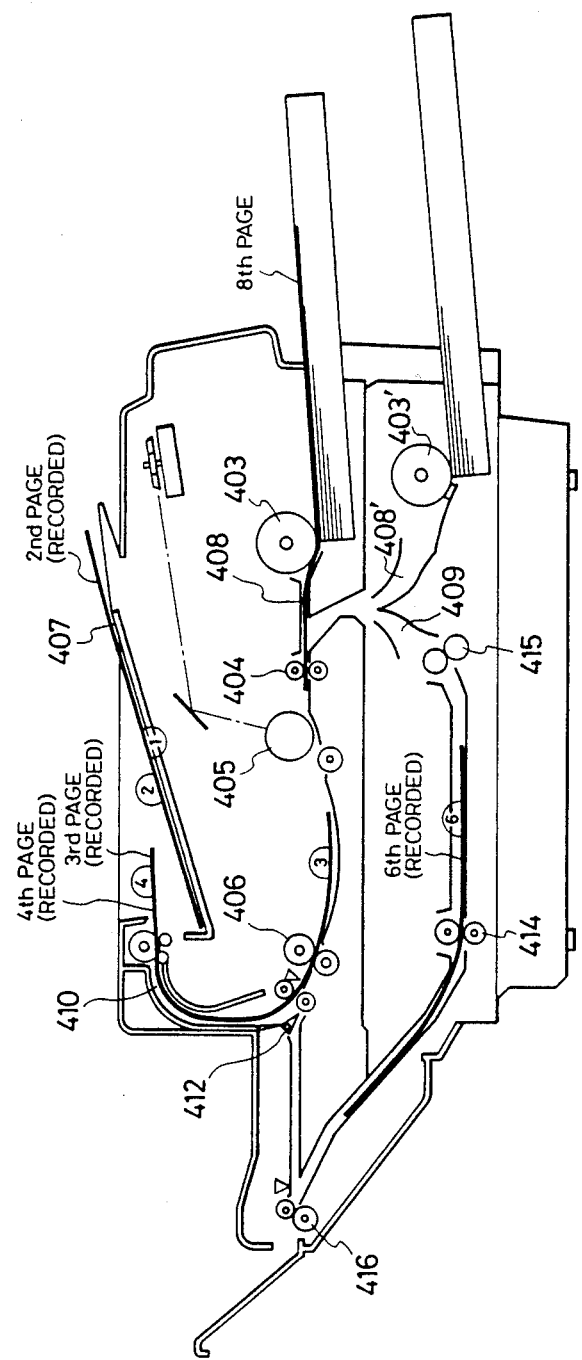
Figure 18:
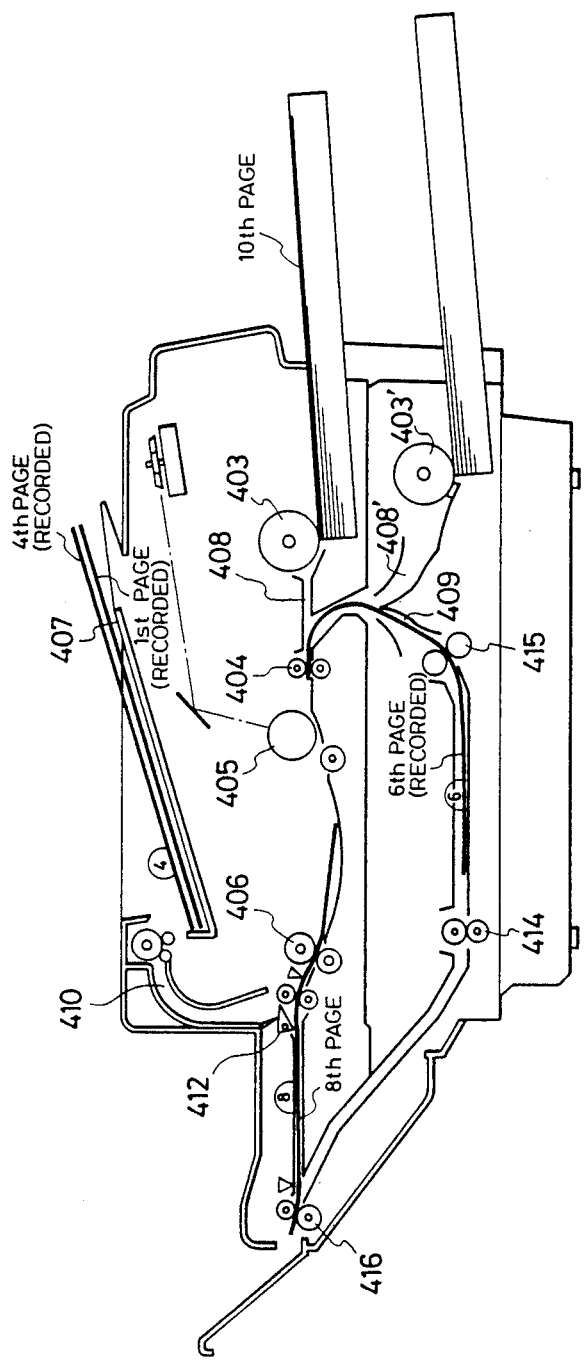
Figure 19:
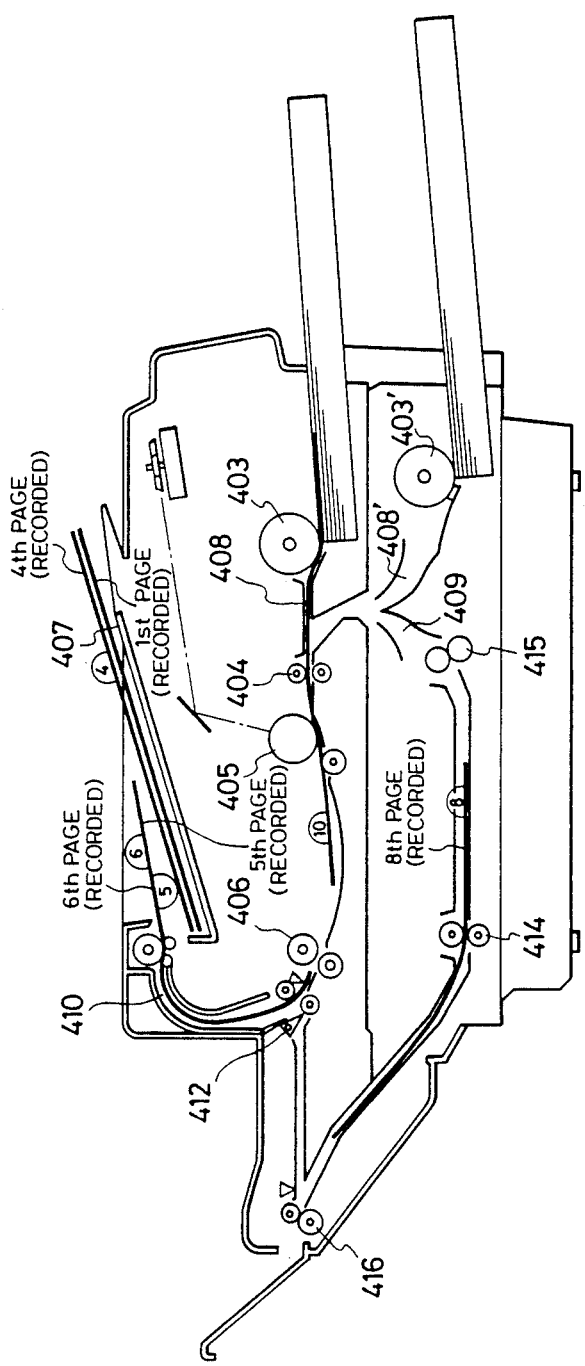
Figure 20:
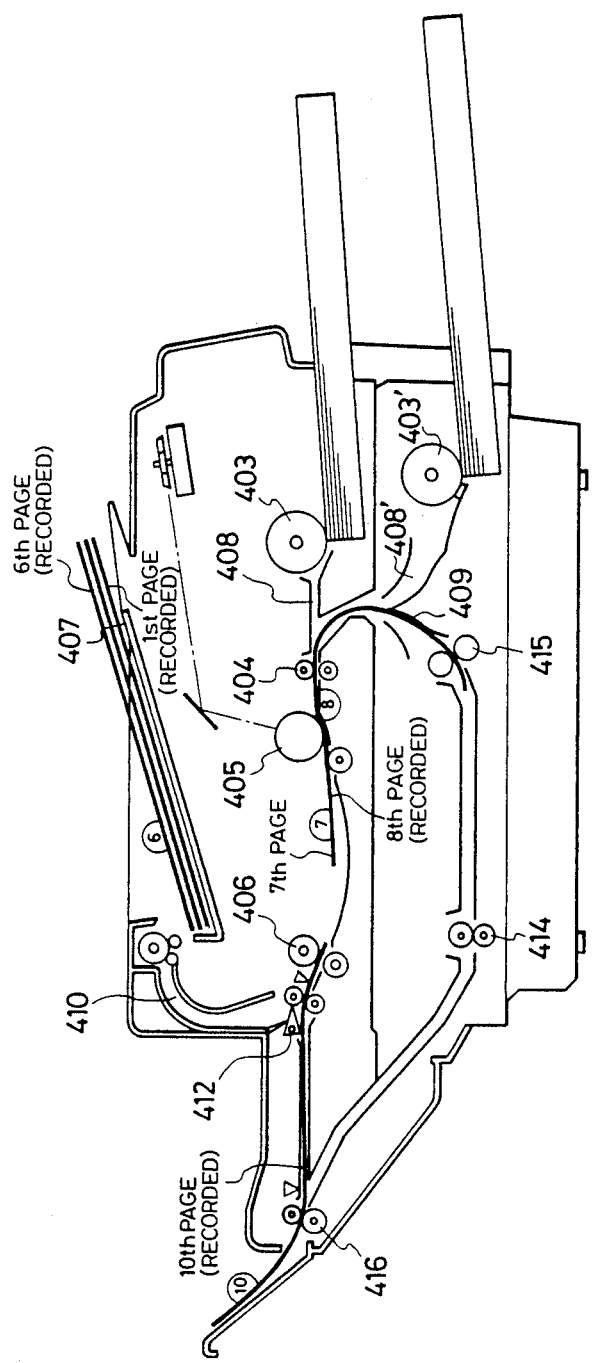

Thus, the first recording medium arrives at the second surface record sheet supply opening by the time when the fourth page has been recorded. Thereupon, the first page now begins to be recorded at a time interval of t after the fourth page has been recorded. Next, as shown in FIG. 15, the first recording medium is conveyed toward the discharge tray 407 by deflecting means 412, and supply of the sixth page is begun by a sheet supply roller 403. Thus, the recording of up to the seventh page shown in FIG. 6 is completed by the operation shown in FIGS. 15 to 20.

Here, it is the ninth page that is to be printed next, and this page is the last job because there is a total of five recording mediums, and much time is required from after the tenth page has been recorded until it arrives at the second surface record sheet supply opening and printing is begun. Accordingly, the interval between sheets is $t_2''$ which is longer than the interval $t_2$ ($t_2'' > t_2$), and the time required for the last printing becomes longer than usual.

Now, where both-surface recording is to be effected by the present recording apparatus, the inversion or upside down of the recording medium is necessary, and a control part 440 for controlling the inversion of the recording medium and controlling the record page sequence will be shown below.

Figure 10:
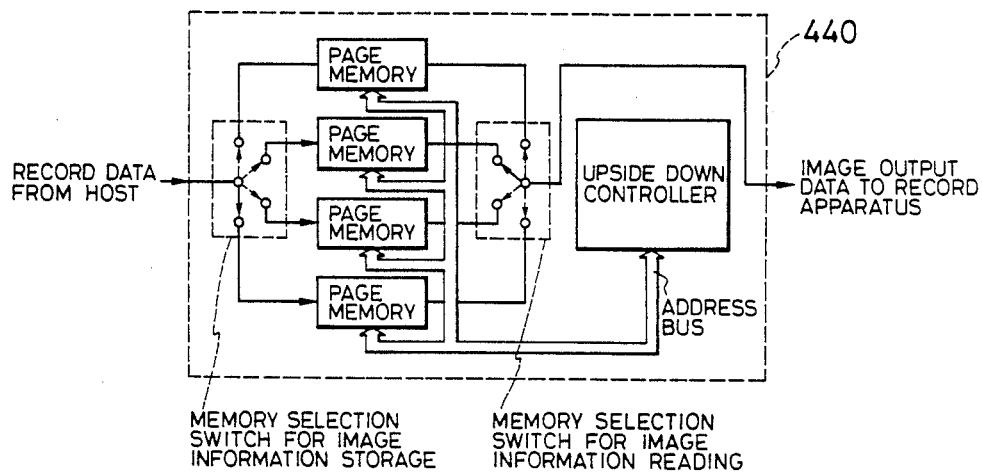
FIG. 10 is a block diagram of control means.
Figure 11:
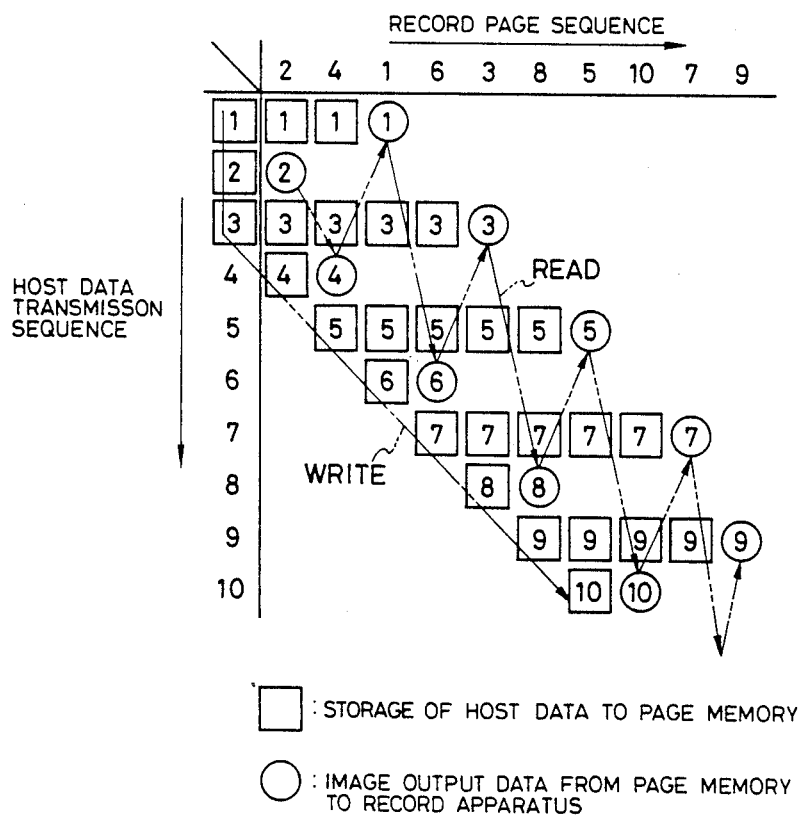
FIG. 11 is a schematic diagram showing the relation between the record page sequence and the host data transmission sequence.

FIG. 11 shows the relation of the record page sequence to the host data transmission sequence, and schematically shows the then write/read operation of the memory. When even-number pages are recorded from the head of the transmitted data, odd-number pages need be inverted and output. This is for making the directions of characters when both-surface recording is effected uniform. Address control is effected by the address bus of FIG. 10 so that odd-number pages 1, 3, 5, 7 and 9 are read in the direction opposite to the direction of written lines, i.e., from the last line.

The present embodiment is designed such that within the recording apparatus, recording mediums can stay at three locations, i.e., the second surface record sheet supply opening, the first surface record sheet supply opening and the second forward and reverse conveying means.

The second forward and reverse conveying means is comprised of a cluth (not shown) for switching on and off the conveyance and a clutch (not shown) for driving the forward rotation and the reverse rotation. That is, two recording mediums can stay in the present apparatus and therefore, at first, recording of the same surface (an even-number surface) is effected on at least two sheets on end.

Figure 8A:
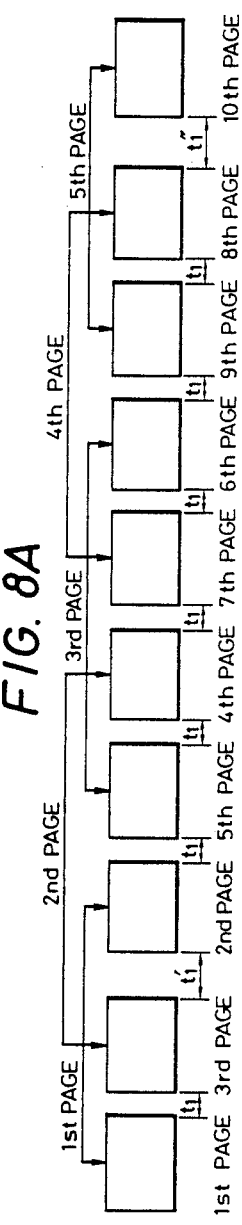
FIG. 8A illustrates another example of the sequence of recording in the case of face-down sheet discharge (in which, after printing, a sheet is discharged straight).

Next, FIG. 8A shows the order of pages in the both-surface recording by face-down discharge (in the case of straight sheet discharge).

FIGS. 21 to 28 schematically show the movement of the recording medium. Members not described here are similar to the members shown in FIG. 12 and common in reference numerals of the order of 10.

Figure 21:
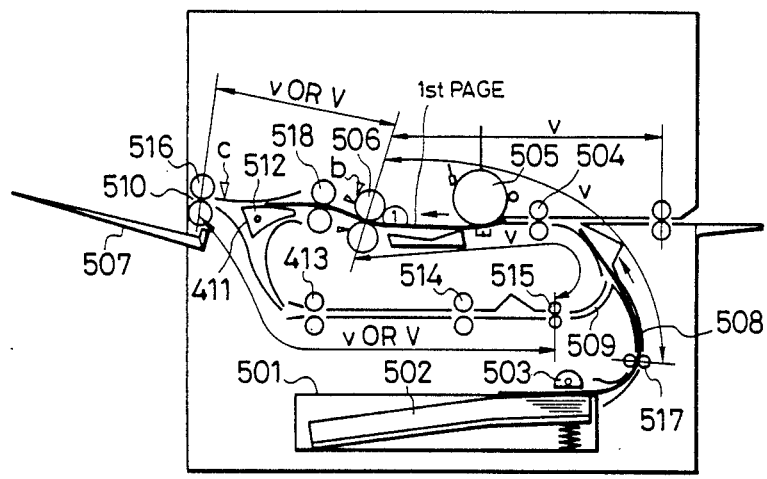
FIGS. 21 to 28 are cross-sectional views showing the flow sheets in another recording apparatus.

The present both-surface recording apparatus is endowed with two conveyance velocities, i.e., v and V (v < V) shown in FIG. 21, and V = 2.4 v. When the first page passes between the fixing rollers 506 after the termination of recording, that is, when the trailing end edge of the recording medium is detected by a sensor b, the trailing end edge of the recording medium is conveyed to a sensor c at the velocity v in the same manner as previously described.

Figure 22:
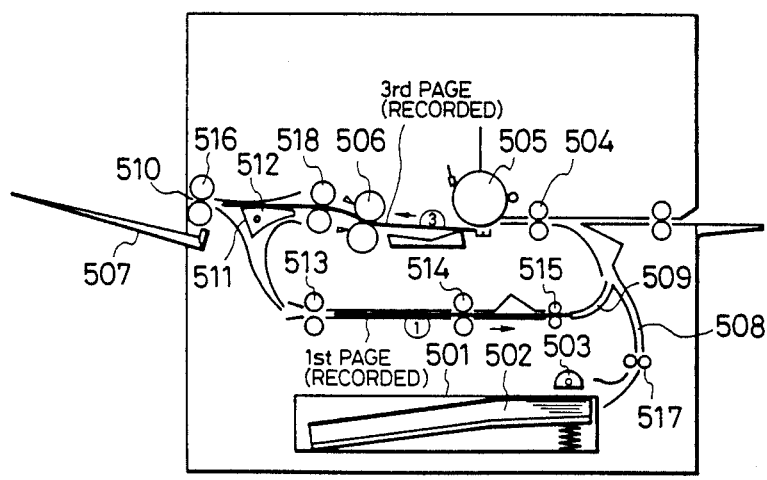
Figure 23:
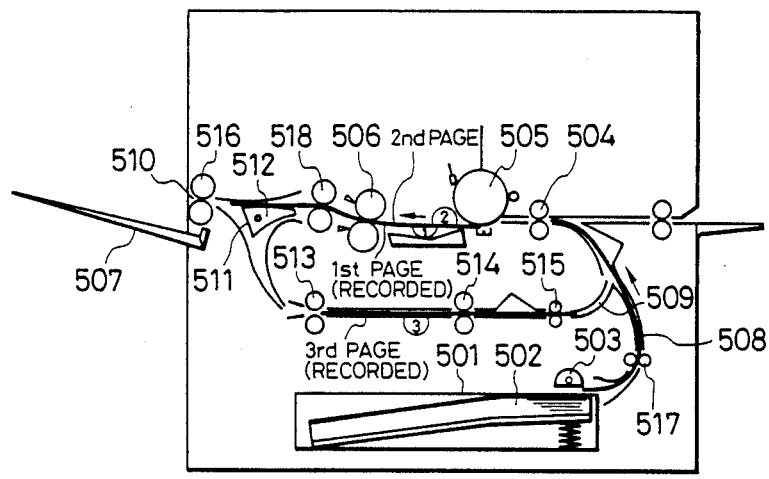
Figure 24:
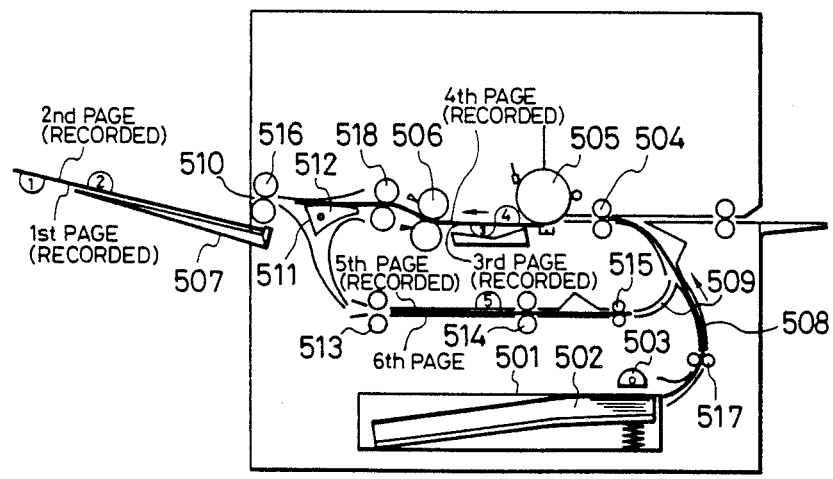
Figure 25:
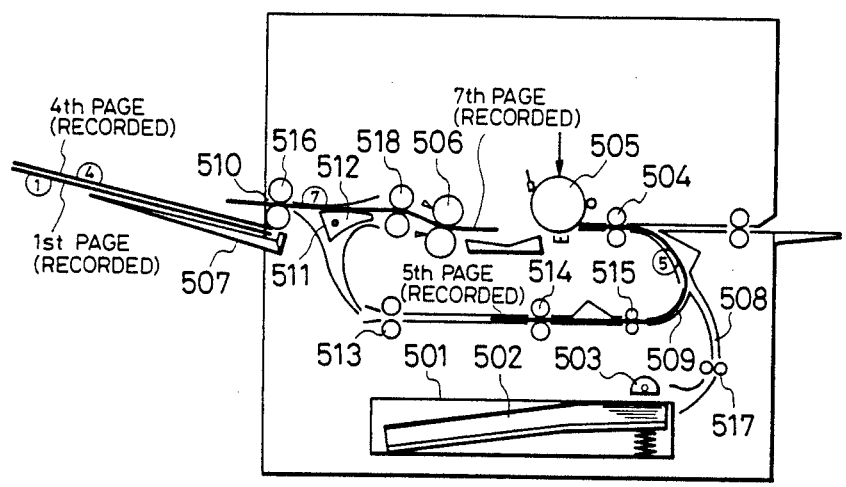
Figure 26:
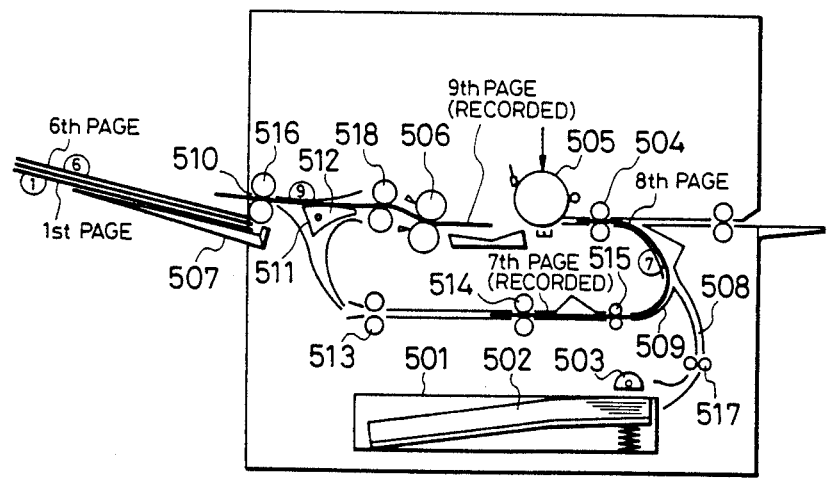
Figure 27:
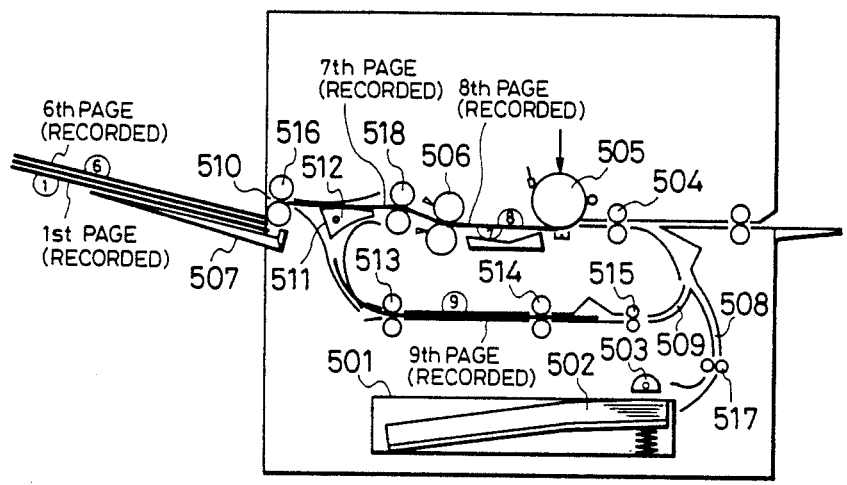
Figure 28:
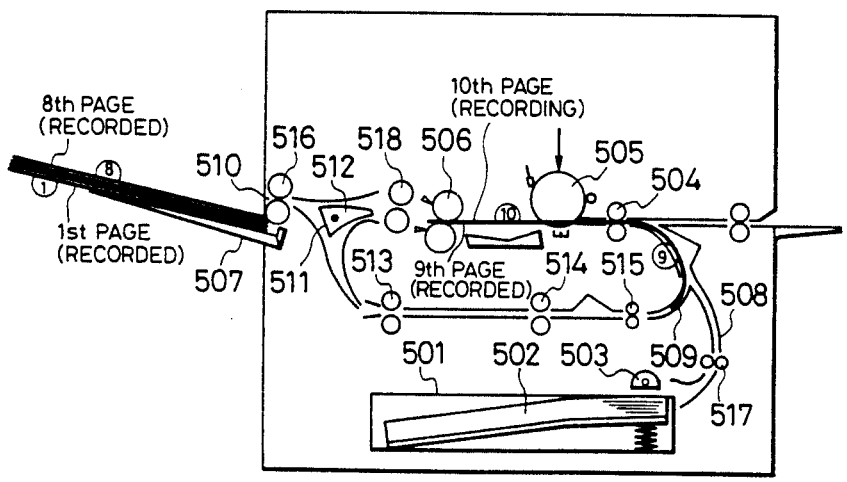

The recording medium is reversed by second forward and reverse conveying means 516 and is intactly conveyed to the second surface record sheet supply opening at the velocity V. This state is shown in FIG. 22. Accordingly, in the present both-surface recording apparatus which is endowed with the aforementioned two conveyance velocities, the recording time interval of continuous sheet supply between the first page and the third page is $t_1$, like the interval between the recording mediums shown in FIG. 8A, and a recording time interval of $t_1'$ which is longer than the interval $t_1$ ($t_1' > t_1$) is required between the third page and the second page. Thereafter, even-number pages and odd-number pages are alternately recorded, and the eighth to tenth pages leading to the last second surface recording are completely recorded in a time $t_1''$ which is longer than the time $t_1$ ($t_1''>t_1$), as in the aforedescribed both-surface recording, because the ordinary time interval $t_1$ is not enough for these pages to arrive at image forming means 505. The relation of the record page sequence to the host data transmission sequence and the control thereof are executed in the same manner as previously described. In this case, only the order of pages differs as shown in FIG. 8A. The inversion of images is effected on even-number pages. Thus, the recording mediums are discharged onto the sheet discharge tray with the order of pages shown in FIG. 7 being made uniform.

According to the foregoing description, such address control is effected that, depending on whether the mode is face-down sheet discharge or face-up sheet discharge, the first surface recording is for one of an even-number page and an odd-number page and at least one of the even-number page and the odd-number page is inverted in order to make the tops and bottoms of the images on the first surface and the second surface, i.e., the front surface and the back surface of the recording medium coincident with each other, whereby read-out is effected.

Another embodiment of the present invention will now be described.

Figure 29:
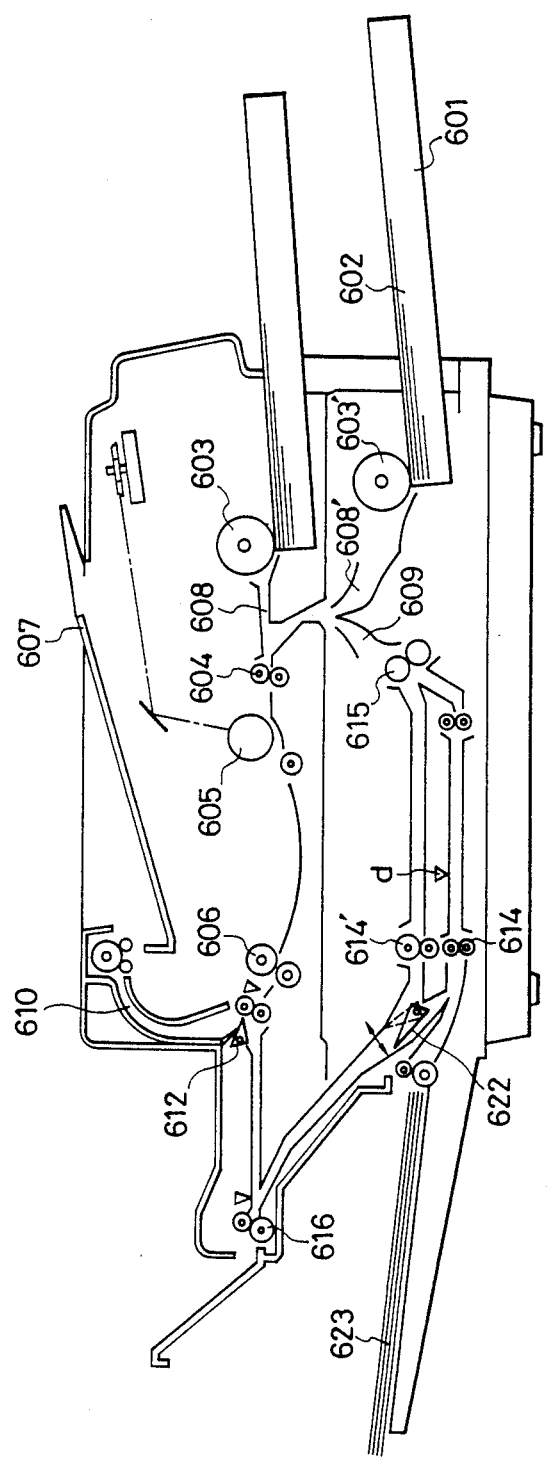
FIG. 29 is a cross-sectional view showing another embodiment of the recording apparatus to which the present invention is applied.

FIG. 29 shows a both-surface recording apparatus provided with a discharge tray, first forward and reverse conveying means 614', 615 and second forward and reverse conveying means 614, 615. In FIG. 29, the reference numeral 622 designates second deflecting means, and the reference numeral 623 denotes a discharge tray. Members not described here are similar to the members shown in FIG. 12 and common in reference numerals of the order of 10.

The present apparatus is of such structure in which recording mediums for both-surface recording can stay at two locations in the apparatus and when the recording mediums are to be discharged onto the discharge tray 623, the recording mediums are directed to rollers 616 and second forward and reverse conveying means and conveyed toward the discharge tray 623, whereby face-up sheet discharge is possible. Printing is effected in the order shown in FIG. 6B. Conversely, when recording is to be effected so that the recording mediums are face-down-discharged onto the discharge tray 607, that is, both-surface recording is effected in the order of pages, recording is effected so that the order of pages is 2, 4, 6, 1,8, 3, 10, 5, 12, 7, ..., whereby an operation similar to that previously described takes place. That is, the first page is recorded for the first time only when at least one of the first and second forward and reverse conveying means has been arrived at and the other is being arrived at (this is detected by a minimum necessary desired position detecting sensor d), whereafter odd-number and even-number pages are alternately recorded in the same manner as previously described.

Figure 6B:
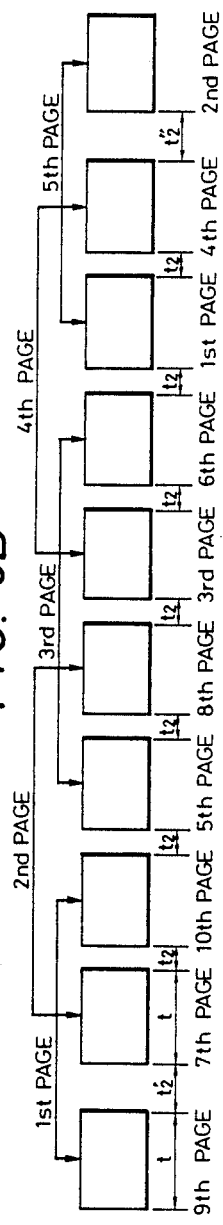
FIG. 6B illustrates the sequence of recording in the case of face-up sheet discharge.
Figure 8B:
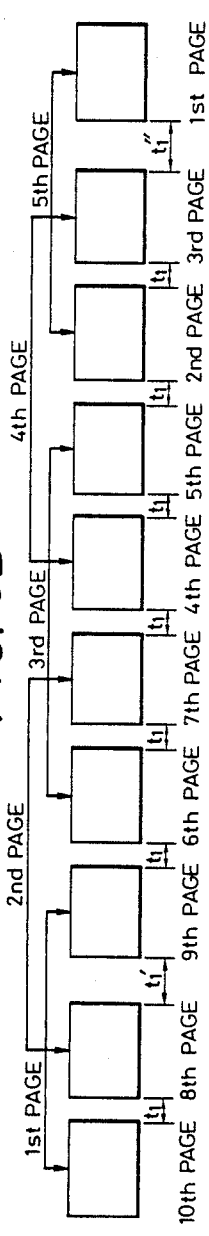
FIG. 8B illustrates another example of the sequence of recording in the case of face-up sheet discharge.
Figure 9:
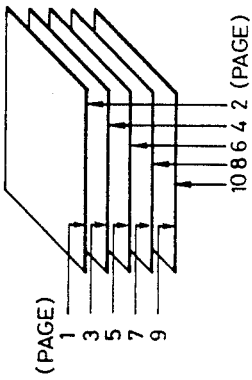
FIG. 9 is a perspective view showing the face-up sheet discharge.

FIG. 9 shows a state in which the recording mediums are piled with the first page thereof facing upward (face-up), and copying is effected in the order shown in FIGS. 6B and 8B. The details of such copying are similar to what has been described in connection with FIGS. 6A and 8A.

The time $t_2'$ will hereinafter be described in detail.

In the both-surface recording apparatus shown in FIG. 12, when recording has been effected in the order of pages shown in FIG. 6A to obtain the highest throughput, it means that the interval $t_2'$ between the second page and the fourth page becomes greater than the ordinary interval $t_2$ between sheets. The principle of it is shown in FIG. 30.

In FIG. 30, the second page arrives at the reversing part, whereafter it is conveyed toward the both-surface sheet supply opening. At this time, the leading end edge of the fourth page can not arrive at the reverse rollers until the trailing end edge a of the second page is conveyed by at least an amount corresponding to the length of the sheet, i.e., l. If it arrives at the reverse rollers, the second page and the fourth page will collide with each other. Incidentally, when the paper size is A4 (l=297 mm) and the recording speed is 47 mm/sec. and the ordinary interval between sheets is 50 mm, $t_2'$ need be $t_2'=297/47=6.3$ sec. or more, and $t_2=50/47=1.1$ sec.

Figure 14:
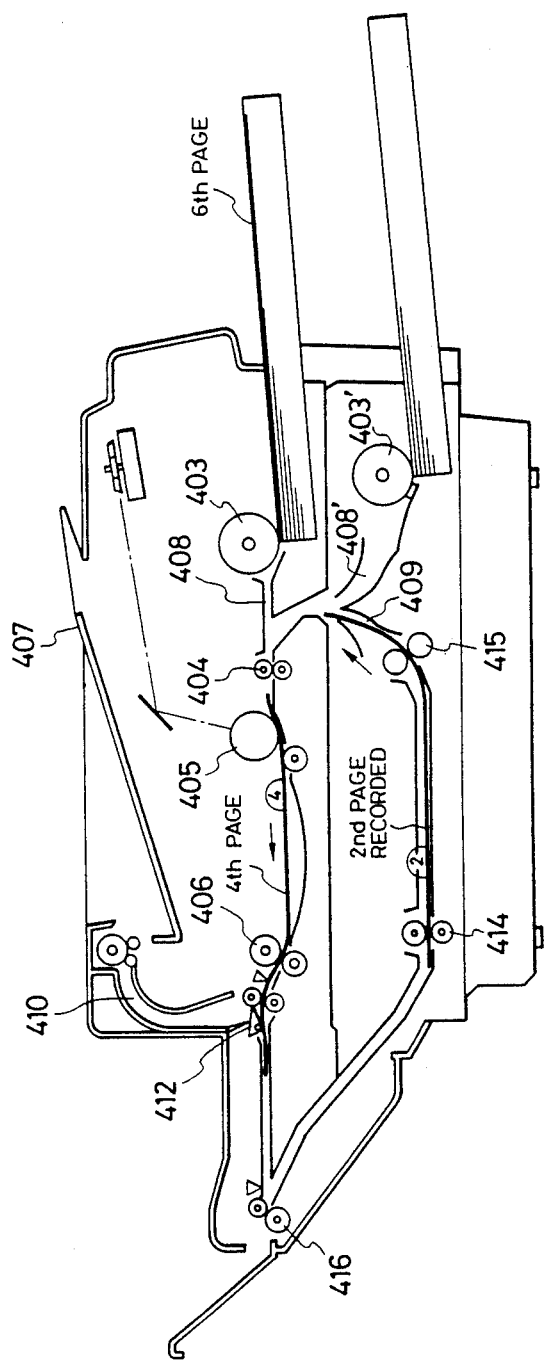

Thus, as shown in FIG. 14, a sheet is supplied from the both-surface sheet supply opening to record the first page. In FIG. 14, the interval between the trailing end edge of the fourth page and the trailing end edge of the first page (the position in FIG. 30) is 50 mm. In the embodiment of FIG. 12, the conveyance velocity is a uniform velocity v, and if the interval 50 mm between sheets as shown in FIG. 14 can not be kept, it is necessary to provide a mode of high conveyance velocity v' between the reverse rollers and the both-surface sheet supply roller. In any case, in the present embodiment, the length $l_1$ is equal or smaller than 50 mm ($l_1 \leq 50$ mm) and therefore, the uniform velocity v and the interval 50 mm between sheets are kept.

Even if the interval between the first page after recorded and the sixth page is $t_2$, the recording medium after having recorded the first page is conveyed to the discharge tray by the flapper 12 as seen from FIG. 15 and therefore, no collision occurs. Moreover, the recording medium for the fourth page is already conveyed from the reversing part to the both-surface sheet supply opening and therefore, no problem arises. Thereafter, alternate sheet supply is executed in the same manner. Description will now be made of the general formulas of the record page sequence described above.

1. General Formulas of the Record Page Sequence (1-1) Where n=2 m (m=1, 2, 3, ...) pages are to be recorded when the number of sheets staying in the apparatus is two:

n=pages, m=number of recorded sheets (1) In the case of F/D (face-down) discharge and where the lowermost one of the piled sheets is the first page (FIG. 7):

2→4→1→6→3→8→5→.
n−2→n−5→n→n3→−n−1

(2) In the case of F/D discharge and where the uppermost one of the piled sheets is the first page (FIG. 9):

n−1n−3→n→n−5→n−2→.
→5→8→3→6→1→4→2

(3) In the case of F/U (face-up) discharge and where the lowermost one of the piled sheets is the first page (FIG. 7):

1→3→2→5→4→7→6→.
→n−3→n−4→n−1→n−2→n (4) In the case of F/U discharge and where the uppermost one of the piled sheets is the first page (FIG. 9):

n→n−2→n−1→n→4→n−3→.
→6→7→4→5→2→3→1

(1-2) Where n=2 m (m=1, 2, 3, ...) pages are to be recorded when the number of sheets staying in the apparatus is three:

(1) In the case of F/D discharge and where the lowermost one of the piled sheets is the first page:

2→4→6→1→8→3→10→.
→n−7→n→n−5→n−3→n−1

(2) In the case of F/D discharge and where the uppermost one of the piled sheets is the first page:
n−1→n−3→n−5→n→n−7→.
→5→8→3→6→1→4→2→

(3) In the case of F/U discharge and where the lowermost one of the piled sheets is the first page:
1→3→5→2→7→4→9→.
→n−6→n−1→n−4→n−2→n (4) In the case of F/U discharge and where the uppermost one of the piled sheets is the first page:
n→n−2→n−4→n−1→n−6→.
→9→4→7→2→5→3→1

When the number of sheets staying in the apparatus is four or more, page control is effected in a similar form of page sequence on the basis of the above-mentioned formulas (1-1) and (1-2).

Where control is to be effected so that the uppermost one of the piled sheets is the first page (including a blank page and the cover page), it is necessary that the host side be provided with a plurality of page memories and control be effected such that feeding is effected from the last page.

Even in such an output form that the cover page is a predetermined format (including a colored sheet and a blank sheet) and the second and subsequent pages are the actual information, the page control on the printer side is unchanged and therefore, supply of image data from the host side is possible if a sheet corresponding to the cover page is additionally fed. An example of it is shown in FIG. 31.

In FIG. 31, 9 in the stage "cover page exists" is the information of the ninth page and actually it is recorded on the back side of the fifth sheet. That is, when the information corresponding to nine pages is to be recorded on both surfaces, if no cover page exists, the tenth page is discharged as a blank (without anything being recorded). However, if the cover page exists, the cover page is provided on the first page and the second to tenth pages are recorded as the information of nine pages. In FIG. 31, the case where "cover page exists" shows a case where the cover page is 0 page and only the effective information is counted as pages.

Figure 32:
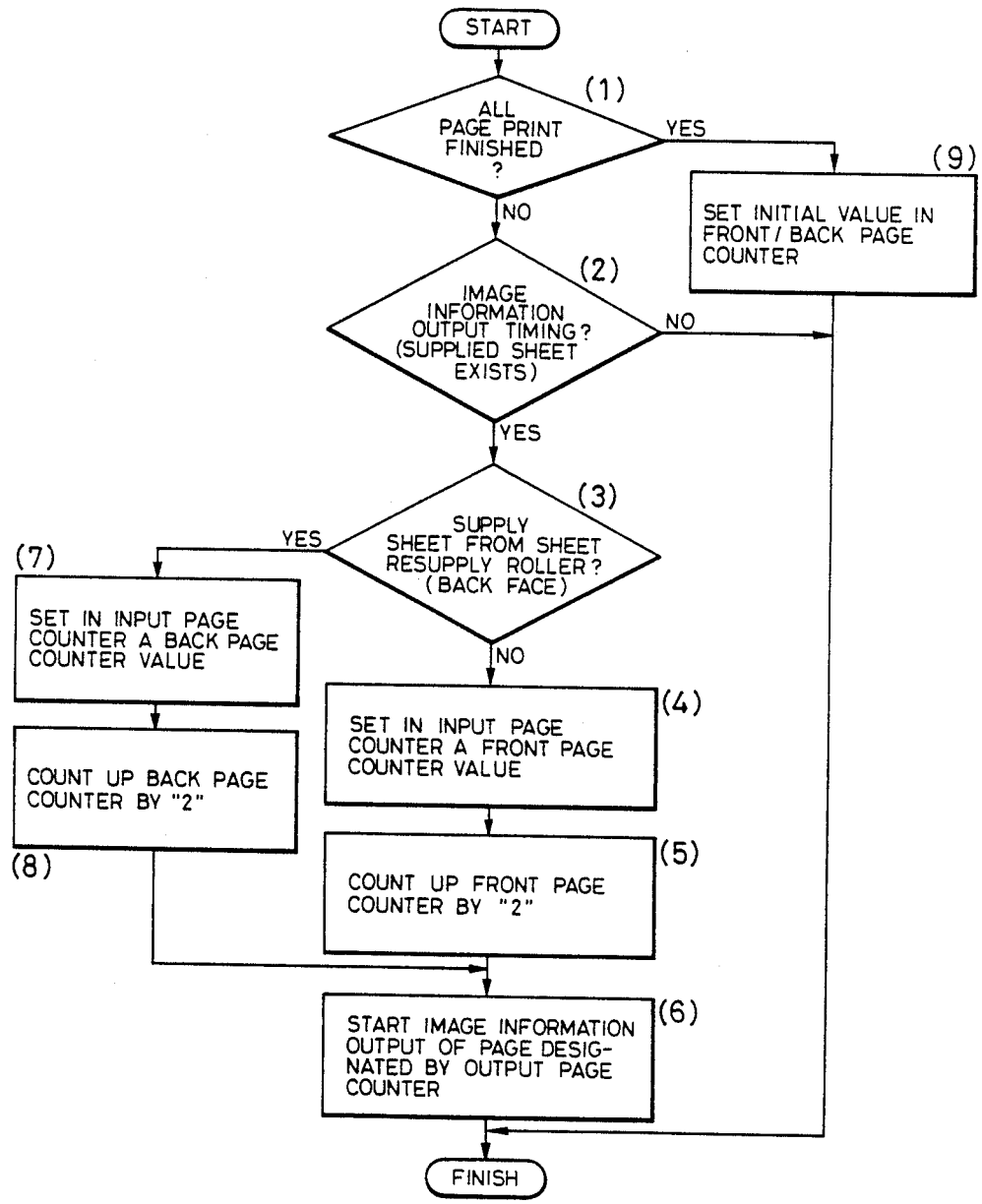
FIG. 32 is a flow chart illustrating the page print control operation procedure.

FIG. 32 is a flow chart illustrating the page print control operation procedure. In FIG. 32, (1)–(9) designate various steps.

Whether printing of all pages has been finished is judged (1), and if the answer is "NO", whether it is the image information output timing is judged (2), and if the answer is "NO", control is finished, and if the answer is "YES", whether a sheet should be supplied from the sheet resupply roller 221 (415, 515, 615) is judged (3), and if the answer is "NO", a front page counter value memorized in the memory of the printer control device 202 is set in the output page counter (4), and the front page counter is counted up by "2" (5). Then, the image information output of the page designated by the output page counter is started (6), and control is finished.

On the other hand, if at step (3), the answer is "YES", a back page counter value is set in the output page counter (7), and the back page counter is counted up by "2" (8), and return is made to step (6).

On the other hand, if at step (1), the answer is "YES", an initial value is set in the front/back page counter (9), and control is finished.

On the other hand, if at step (4), the answer is "NO", advance is made to step (10) and subsequent steps.

On the other hand, if at step (3), tne answer is "NO", whether the recording sheet 207 (402, 502, 602) exists at the sheet resupply roller 221 (415, 515, 615) is judged (6), and if the answer is "NO", return is made to step (5), and if the answer is "YES", the print sequence by the cassette/both-surface alternate sheet supply mode is started, and sheet supply from the sheet resupply roller 221 is commanded (8), and advance is made to step (11) and subsequent steps.

On the other hand, if at step (2), the answer is "YES", the cassette/both-surface alternate sheet supply mode is released (9), and sheet supply from the sheet resupply roller 221 is commanded (10).

Then, whether when the sheet supply form the sheet supply cassette 205 has been commanded, the recording sheets 207 do not exist in the sheet supply cassette 205 and sheet supply is impossible (an error exists) is judged (11), and if the answer is "NO", a sheet is supplied from a designated sheet supply opening (12), and control is finished.

On the other hand, if at step (11), the answer is "YES", whether the substance of the error is the error of no cassette sheet by the cassette sheet supply command is judged (13), and if the answer is "NO", control is finished without sheet supply being effected, and if the answer is "YES", whether there is a recording sheet 207 already supplied from the sheet supply cassette 205 and not yet supplied from the sheet resupply rollers 221, that is, a recording sheet 207 being conveyed toward the sheet resupply rollers 221 or having already arrived at the sheet resupply rollers 221 and waiting there, is judged while being monitored by the printer control device 202 (14), and if the answer is "NO" (only when there is no cassette from the first sheet supplied from the cassette during the printing operation), sheet supply is not effected and control is finished, and if the answer is "YES", the command is changed from the sheet supply from the cassette to the sheet supply from the sheet resupply rollers (15), and return is made to step (12), whereafter priority is given to the sheet supply from the sheet resupply rollers 221 and an image forming process on the recording sheet 207 remaining in the both-surface conveyance path is executed.

Therefore, if a recording sheet 207 only on the front surface of which printing has been effected remains in the printer apparatus when recording sheets 207 have become exhausted in the sheet supply cassette 205 before printing on a predetermined number of sheets is terminated, printing on the back surface of the remaining recording sheet 207 is effected by priority.

Accordingly, if recording sheets 207 have become exhausted in the sheet supply cassette 205 when an attempt is made to supply the fifth sheet (printing of the ninth page) from the cassette after the supply of the second sheet (printing of the fourth page) from the sheet resupply rollers 221 has been effected as shown in FIG. 34, the third sheet (printing of the sixth page) is supplied from the sheet resupply rollers 221, and if recording sheets remain exhausted in the cassette after that, the fourth sheet (printing of the eighth page) is further supplied from the sheet resupply rollers 221. At this time, there is no recording sheet 207 remaining in the print engine 204, and the print engine 204 stands by until the sheet supply cassette 205 is refilled with recording sheets 207. That is, even if some power source trouble occurs to the print engine 204 in the meantime, loss of information and waste of sheets by reprinting can be prevented because there is no recording sheet 207 remaining in the apparatus.

In FIG. 34, Δt indicates the standby time (the return time), and after the lapse of this standby time Δt, return is made to the normal printing sequence.

The above embodiments have been described with respect to a case where this invention is applied to a laser beam printer capable of both-surface printing, whereas this invention is not restricted to both-surface printing or the printing system, but is readily applicable to any printer apparatus having one or more sheet supply openings and means for circulating a sheet-like recoridng medium once supplied to the printer body and resupplying it to a printing position.

FIG. 35 is a schematic diagram illustrating the ordinary page print output state before improved. In this FIG. 35, the rectangles indicated by solid lines show the front surfaces and correspond to the recording sheets 207 supplied from the sheet supply cassette 205, and the rectangles indicated by broken lines show the back surfaces and correspond to the recording sheets 207 supplied from the sheet resupply rollers 221, and the numerals in the rectangles indicate page numbers.

Figure 33:
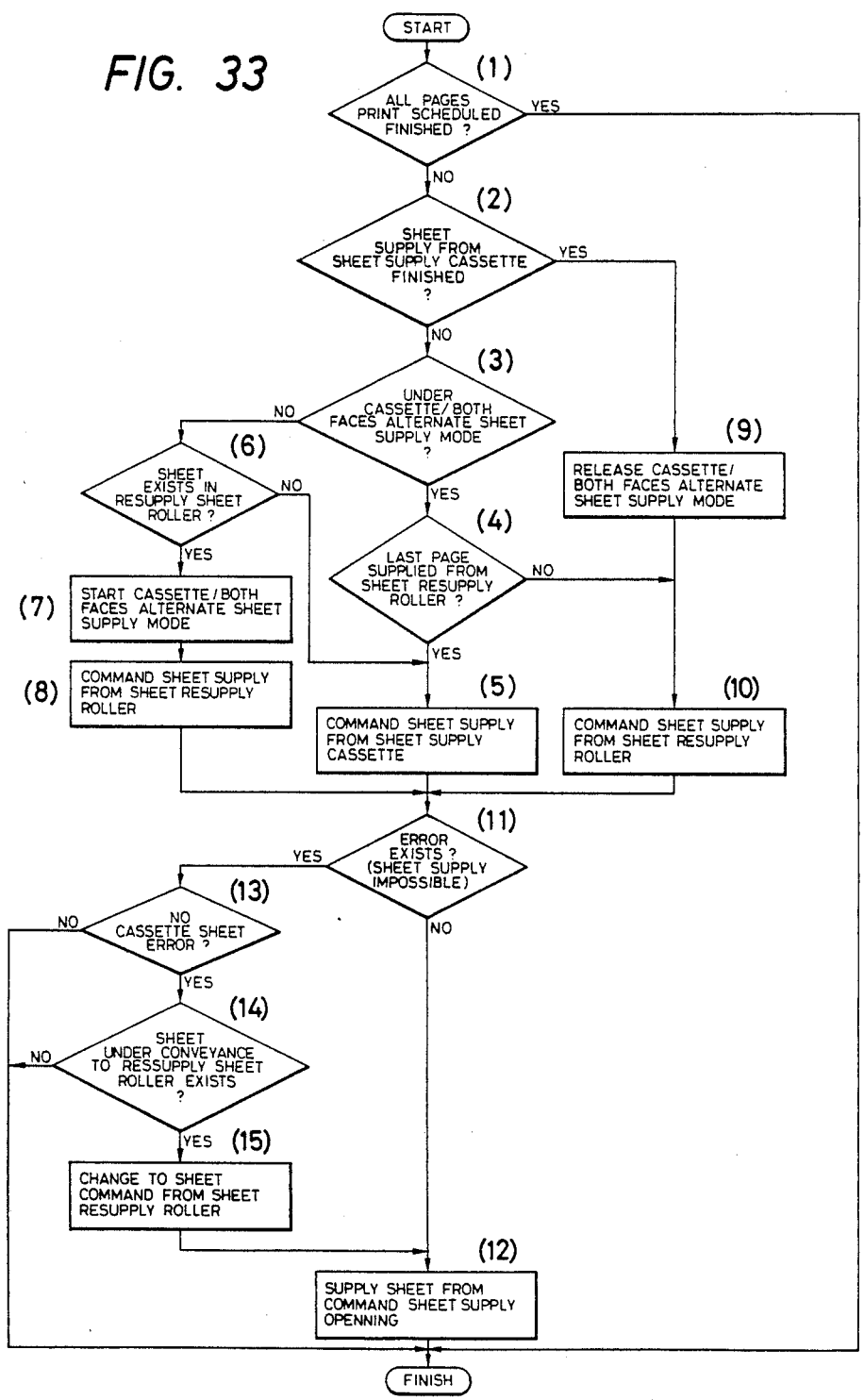
FIG. 33 is a flow chart illustrating another example of the printer control system according to another embodiment of the present invention.

Now, if exhaustion of recording sheets occurs when a predetermined number of sheets to be printed is supplied from the sheet supply cassette 205 (generally the sheet supply means outside the printer) during continuous printing operation, the condition of steps (11) shown in FIG. 33 is established, and the sheet supply becomes impossible and the printing sequence is interrupted.

Thus, recording sheets 207, not being supplied from the sheet resupply rollers 221, are on standby in the print engine 204 until the sheet supply cassette 205 is refilled with recording sheets (cut sheets) 207 by the operator or the like.

For example, if recording sheets have become exhausted in the sheet supply cassette 205 when an attempt is made to supply the fifth sheet (printing of the ninth page) of the cassette-supplied sheets (solid-line rectangles), four sheets supplied from the sheet supply cassette (printing of the first, third, fifth and seventh pages) minus two sheets supplied from the sheet resupply rollers 221 (printing of the second and fourth pages) remain in the print engine 204 with only their front surfaces printed.

If at this time, some error, for example, an error by momentary cut-off of the power source, occurs to the print engine 204, the print sequence is reset to its initial condition and therefore, the recording sheets remaining in the apparatus become useless and also, reprinting of image information already printed may become unavoidable and the printing efficiency may be remarkably spoiled.

Also, generally with a printer connected to a computer or the like, it is rarely the case that the operator monitors the printing condition at all times and therefore, a considerable time is required before the exhaustion of recording sheets in the sheet supply cassette 205 which occurs during the cassette/both-surface alternate sheet supply mode process as described above is recognized, and a further time is required before the operator recognizes the exhaustion of recording sheets and fills the cassette with recording sheets 207 to restore the printing, and this has led to the problem that the print-stopped condition lasts for a long time and remarkably reduces the printing efficiency.

The construction of said another embodiment shown in FIGS. 33 and 34 eliminates such inconveniences.

We claim:

1. A control method for a both-surface recording apparatus provided with memory means for memorizing and reading record information sequent on each page, recording means for recording the record information of a plurality of pages, out of said information, discretely on a first surface and a second surface of a recording medium, and control means, characterized in:
that recording of different pages is continuously effected on a first surface of each of plural new recording media until the first recording medium on a first surface of which recording has been effected again arrives at the entrance to said recording means; and
that thereafter, recording of a page sequent to a page of the first surface of said first recording medium is effected on a second surface of the first recording medium, whereafter recording on a first surface of another new recording medium and recording of a page on a second surface of the recording medium which is sequent to the page of the first surface of the recording medium on the first surface of which recording has been effected are alternatively effected.

2. A control method according to claim 1, wherein when the first surface recording is fixed to one of an even-number page and an odd-number page, the second surface recording is fixed to the other of the even-number page and the odd-number page.

3. A control method according to claim 1, wherein the recording progresses in such sequence that the second page is recorded on a first surface of the first recording medium, the fourth page is recorded on a first surface of a succeeding recording medium, the first page is recorded on a second surface of the first recording medium, the sixth page is recorded on a first surface of a new recording medium, and the third page is recorded on a second surface of the recording medium on which the fourth page has been recorded.

4. A control method according to claim 1, wherein the recording progresses in such sequence that (the last page-1)th page is recorded on a first surface of the first recording medium, (the last page-3)th page is recorded on a first surface of a succeeding recording medium, the last page is recorded on a second surface of the first recording medium, (the last page-5)th page is recorded on a first surface of a new recording medium, and (the last page-2)th page is recorded on a second surface of the recording medium on which (the last page-3)th page has been recorded.

5. A control method according to claim 1, wherein the recording progresses in such sequence that the first page is recorded on a first surface of the first recording medium, the third page is recorded on a first surface of a succeeding recording medium, the second page is recorded on a second surface of the first recording medium, the fifth page is recorded on a first surface of a new recording medium, and the fourth page is recorded on a second surface of the recording medium on which the third page has been recorded.

6. A control method, according to claim 1, wherein the recording progresses in such sequence that the last page is recorded on a first surface of the first recording medium, (the last page-2)th page is recorded on a first surface of a succeeding recording medium, (the last page-1)th page is recorded on a second surface of the first recording medium, (the last page-4)th page is recorded on a first surface of a new recording meidum, and (the last page-3)th page is recorded on a second surface of the recording medium on which (the last page-2)th page has been recorded.

7. A control method according to claim 1, wherein the recording progresses in such sequence that the second page is recorded on a first surface of the first recording medium, the fourth and sixth page is independently and sequentially recorded on a first surface of two succeeding recording media, the first page is recorded on a second surface of the first recording medium, the eight page is recorded on a first surface of a new recording medium, and the third page is recorded on a second surface of the recording medium on which the fourth page has been recorded.

8. A control method according to claim 1, wherein the recording progresses in such sequence that (the last page-1)th page is recorded on a first surface of the first recording medium, (the last page-3)th page and (the last page-5)th page is independently and sequentially recorded on a first surface of two succeeding recording media, the last page is recorded on a second surface of the first recording medium, (the last page-7)th page is recorded on a first surface of a new recording medium, and (the last page-2)th page is recorded on a second surface of the recording medium on which (the last page-3)th page has been recorded.

9. A control method according to claim 1, wherein the recording progresses in such sequence that the first page is recorded on a first surface of the first recording medium, the third and fifth page is independently and sequentially recorded on a first surface of two succeeding recording media, the second page is recorded on a second surface of the first recording medium, the seventh page is recorded on a first surface of a new recording medium, and the fourth page is recorded on a second surface of the recording medium on which the third page has been recorded.

10. A control method according to claim 1, wherein the recording progresses in such sequence that the last page is recorded on a first surface of the first recording medium, (the last page-2)th page and (the last page-4)th page is independently and sequentially recorded on a first surface of two succeeding recording media, (the last page-1) the page is recorded on a second surface of the first recording medium, (the last page-6)th page is recorded on a first surface of a new recording medium, and (the last page-3)th page is recorded on a second surface of the recording medium on which (the last page-2)th page has been recorded.

11. A control method according to claim 1, wherein the recording progresses in such sequence that the second page is recorded on a first surface of the first recording medium, the fourth, sixth and eighth page is independently and sequentially recorded on a first surface of three succeeding recording media, the first page is recorded on a second surface of the first recording medium, the tenth page is recorded on a first surface of a new recording medium, and the third page is recorded on a second surface of the recording medium on which the fourth page has been recorded.

12. A control method according to claim 1, wherein the recording progresses in such sequence that (the last page-1)th page is recorded on a first surface of the first recording medium, (the last page-3)th page, (the last page-5)th page and (the last page-7)th page is independently and sequentially recorded on a first surface of three succeeding recording media, the last page is recorded on a second surface of the first recording medium, (the last page-9)th page is recorded on a first surface of a new recording medium, and (the last page-2)th page is recorded on a second surface of the recording medium on which (the last page-3)th page has been recorded.

13. A control method according to claim 1, wherein the recording progresses in such sequence that the first page is recorded on a first surface of the first recording medium, the third, fifth and seventh page is independently and sequentially recorded on a first surface of three succeeding recording media, the second page is recorded on a second surface of the first recording medium, the ninth page is recorded on a first surface of a new recording medium, and the fourth page is recorded on a second surface of the recording medium on which the third page has been recorded.

14. A control method according to claim 1, wherein the recording progresses in such sequence that the last page is recorded on a first surface of the first recording medium, (the last page-2)th page, (the last page-4)th page and (the last page-6)th page is independently and sequentially recorded on a first surface of three succeeding recording media, (the last page-1)th page is recorded on a second surface of the first recording medium, (the last page-8)th page is recorded on a first surface of a new recording medium, and (the last page-3)th page is recorded on a second surface of the recording medium on which (the last page-2)th page has been recorded.

* * * * *

UNITED STATES PATENT AND TRADEMARK OFFICE
CERTIFICATE OF CORRECTION

PATENT NO. : 4,978,980

DATED : December 18, 1990

INVENTOR(S) : Akio NOGUCHI, ET AL

It is certified that error appears in the above-identified patent and that said Letters Patent is hereby corrected as shown below:

COLUMN 14:

Claim 1 should read as follows:
--A control method for a both-surface recording apparatus provided with memory means for memorizing and reading record information sequent on each page, recording means for recording the record information of a plurality of pages, out of said record information, discretely on a first surface and a second surface of a recording medium, and control means for controlling said memory means and circulation of said recording means in the apparatus, characterized in:
 that recording of different pages is continuously effected on a first surface of each of plural new recording media until the first recording medium on a first surface of which recording has been effected again arrives at the entrance to said recording means; and

UNITED STATES PATENT AND TRADEMARK OFFICE
CERTIFICATE OF CORRECTION

PATENT NO. : 4,978,980

DATED : December 18, 1990

INVENTOR(S) : Akio NOGUCHI, ET AL

It is certified that error appears in the above-identified patent and that said Letters Patent is hereby corrected as shown below:

that thereafter, recording of a page sequent to a page of the first surface of said first recording medium is effected on a second surface of the first recording medium, whereafter recording of a page on a first surface of another new recording medium, and recording of a page sequent to the page of the first surface of the recording medium on a second surface of the recording medium on the first surface of which recording has been effected, and circulating of the media in the apparatus, are alternately effected.--

COLUMN 1:

Line 24, "and" should be deleted.

COLUMN 15:

Line 2, "meidum," should read --medium--; and

Line 48, "last page-1) the Page" should read
--last page-1)th page--.

COLUMN 10:

Line 50, "n–2→n–5→n→n3→–n–1" should read
--n–2→n–5→n→n–3→n–1--; and

Line 53, "n–1n–3→n→n–5→n–2→" should read
--n–1→n–3→n→n–5→n–2→--.

UNITED STATES PATENT AND TRADEMARK OFFICE
CERTIFICATE OF CORRECTION

PATENT NO. : 4,978,980        Page 3 of 3

DATED : December 18, 1990

INVENTOR(S) : Akio NOGUCHI, ET AL

It is certified that error appears in the above-identified patent and that said Letters Patent is hereby corrected as shown below:

COLUMN 11:

Line 6, "→5→8→3→6→1→4→2→" should read
-- →5→8→3→6→1→4→2--.

Signed and Sealed this

Fifteenth Day of December, 1992

Attest:

DOUGLAS B. COMER

Attesting Officer      Acting Commissioner of Patents and Trademarks